US012109491B2

(12) United States Patent
Khan

(10) Patent No.: US 12,109,491 B2
(45) Date of Patent: Oct. 8, 2024

(54) METHOD AND SYSTEM FOR PROVIDING TACTICAL ASSISTANCE TO A PLAYER IN A SHOOTING VIDEO GAME

(71) Applicant: SQUARE ENIX LIMITED, London (GB)

(72) Inventor: Fahad Khan, Montréal (CA)

(73) Assignee: SQUARE ENIX LIMITED, London (GB)

( * ) Notice: Subject to any disclaimer, the term of this patent is extended or adjusted under 35 U.S.C. 154(b) by 226 days.

(21) Appl. No.: 17/544,278

(22) Filed: Dec. 7, 2021

(65) Prior Publication Data
US 2022/0241691 A1 Aug. 4, 2022

(30) Foreign Application Priority Data

Feb. 2, 2021 (CA) ..................... 3107889

(51) Int. Cl.
*A63F 13/53* (2014.01)
*A63F 13/46* (2014.01)
*A63F 13/837* (2014.01)

(52) U.S. Cl.
CPC ............. *A63F 13/53* (2014.09); *A63F 13/46* (2014.09); *A63F 13/837* (2014.09); *A63F 2300/8076* (2013.01)

(58) Field of Classification Search
CPC ........ A63F 13/53; A63F 13/46; A63F 13/837; A63F 2300/8076; A63F 13/5375; A63F 13/92
See application file for complete search history.

(56) References Cited

U.S. PATENT DOCUMENTS

| 6,533,663 B1 * | 3/2003 | Iwao ....................... A63F 13/45 463/31 |
| 2005/0225530 A1 * | 10/2005 | Evans ..................... A63F 13/22 345/156 |
| 2007/0270226 A1 * | 11/2007 | York ....................... A63F 13/00 463/43 |

(Continued)

OTHER PUBLICATIONS

Fallout 4. Wikipedia.org. Online. Accessed via the Internet. Accessed Sep. 8, 2023. <URL: https://en.wikipedia.org/wiki/Fallout_4> (Year: 2015).*

(Continued)

*Primary Examiner* — Justin L Myhr
*Assistant Examiner* — Carl V Larsen
(74) *Attorney, Agent, or Firm* — GREENBLUM & BERNSTEIN, P.L.C.

(57) ABSTRACT

A computer-implemented method, computer-readable medium and video game apparatus for a video game. The method includes maintaining a virtual environment in memory, the virtual environment comprising a player-controlled game object and a second game object, the player-controlled game object being associated with a virtual display component. The method also includes determining if the virtual display component satisfies a position condition relative to the second game object and, if so, obtaining preview information indicative of an interactive gameplay effect that would be carried out in the event of receipt of activation input via a game control interface and displaying the preview information in the virtual display component displayed on a screen.

38 Claims, 15 Drawing Sheets

(56) References Cited

U.S. PATENT DOCUMENTS

| | | | | |
|---|---|---|---|---|
| 2009/0325699 | A1* | 12/2009 | Delgiannidis | A63F 13/42 463/32 |
| 2013/0196767 | A1* | 8/2013 | Garvin | A63F 13/56 463/36 |
| 2018/0356856 | A1* | 12/2018 | Jamele | G06F 1/1601 |
| 2020/0316470 | A1* | 10/2020 | Yang | A63F 13/5372 |

OTHER PUBLICATIONS

Fallout 4—V.A.T.S (Tutorial). Youtube.com. Online. Nov. 21, 2015. Accessed via the Internet. Accessed Sep. 8, 2023. <URL: https://www.youtube.com/watch?v=Vgjt6mj6J3k> (Year: 2015).*

Fallout 4: How to Use V.A.T.S. vg247.com. Online. Sep. 26, 2017. Accessed via the Internet. Accessed Sep. 8, 2023. <URL: https://www.vg247.com/fallout-4-how-to-use-vats> (Year: 2017).*

What is the point of an empty VATS? gaming.stackexchange.com. Online. Apr. 13, 2017. Accessed via the Internet. Accessed Sep. 8, 2023. <URL: https://gaming.stackexchange.com/questions/298482/what-is-the-point-of-an-empty-vats> (Year: 2017).*

Into the Breach. Wikipedia.org. Online. Accessed via the Internet. Accessed Sep. 8, 2023. <URL: https://en.wikipedia.org/wiki/Into_the_Breach> (Year: 2018).*

How to Master Into the Breach—Episode 1: Mastering Mechanics (Tips for mastering the game). Youtube.com. Online. Sep. 30, 2020. Accessed via the Internet. Accessed Sep. 8, 2023. <URL: https://www.youtube.com/watch?v=5ACNdJJxV_M> (Year: 2020).*

Let's Play Into The Breach—PC Gameplay Part 1—We Have To Go Back! Youtube.com. Online Feb. 27, 2017. Accessed via the Internet. Accessed Sep. 8, 2023. <URL: https://www.youtube.com/watch?v=pXfCxJudn7k> (Year: 2018).*

Into the Breach: Combat guide. Guides.gamepressure.com. Online. Sep. 3, 2020. Accessed via the Internet. Accessed Sep. 8, 2023. <URL: https://guides.gamepressure.com/into_the_breach/guide.asp?ID=43640> (Year: 2020).*

Hitman 2 (2018 video game). Wikipedia.org. Online. Accessed via the Internet. Accessed Sep. 8, 2023. <URL: https://en.wikipedia.org/wiki/Hitman_2_(2018_video_game)> (Year: 2018).*

Hitman 2—Hide the body. Youtube.com. Online. Sep. 29, 2020. Accessed via the Internet. Accessed Sep. 8, 2023. <URL: https://www.youtube.com/watch?v=tPvQdIIFS2s> (Year: 2020).*

Body Containers. Hitman.fandom.com. Online. Oct. 31, 2020. Accessed via the Internet. Accessed Sep. 8, 2023. <URL: https://hitman.fandom.com/wiki/Body_Containers?oldid=87382> (Year: 2020).*

Ghost of Tsushima. Wikipedia.org. Online. Accessed via the Internet. Accessed Sep. 8, 2023. <URL: https://en.wikipedia.org/wiki/Ghost_of_Tsushima> (Year: 2020).*

Wind Chime. Ghostoftsushima.fandom.com. Online. Dec. 10, 2020. Accessed via the Internet. Accessed Sep. 8, 2023. <URL: https://ghostoftsushima.fandom.com/wiki/Wind_chime?oldid=10286> (Year: 2020).*

Clearing Mongols with just Wind Chimes—Ghost of Tsushima. Youtube.com. Online. Aug. 8, 2020. Accessed via the Internet. Accessed Sep. 8, 2023. <URL: https://www.youtube.com/watch?v=rxUUes7UfN8> (Year: 2020).*

Screenshot of the video game Fallout showing tactical mod as shown in 'What is V.A.T.S? Fallout 4 Guide', 1 page, Author unknown, initially consulted on Sep. 25, 2020, screenshot generated Feb. 10, 2021.

* cited by examiner

METHOD AND SYSTEM FOR PROVIDING TACTICAL ASSISTANCE TO A PLAYER IN A SHOOTING VIDEO GAME

FIELD

The present application relates generally to video games and, in particular, to a method and system for providing tactical assistance to a player in a shooting video game.

BACKGROUND

Shooting video games provide great satisfaction for certain players. Such satisfaction is derived from a combination of (i) progression through challenges requiring concentration and strategy, (ii) visual impact of fantasy locations and scenarios, and (iii) precision manipulation and control of virtual weaponry.

Shooting video games involve relatively simple actions on the part of the player, namely aiming and shooting the weaponry, sometimes in addition to moving a playing character. Despite this apparent simplicity, the player needs to choose wisely where to aim and when to shoot, so as to meet various competing constraints. These constraints may include limits on ammunition and time remaining, approaching threats and/or reaching a certain score or level. As such, depending on when and where (and whether) the player chooses to shoot, the range of outcomes is large, from complete failure to absolute success, and everywhere in between.

At the same time, video games tend to be deterministically programmed, whereby a specific action taken by the player in a specific set of gameplay circumstances leads to a predictable gameplay effect. Therefore, it is possible, based on the computer code behind the game, to know the outcome of an action in the event it were to take place, but without the action actually having to take place in order to gain such knowledge. Elements of such knowledge can thus be provided by the computer as "tactical assistance" to help the player refine their shooting strategy, improve performance and increase satisfaction.

SUMMARY

According to various aspects, this disclosure relates to a method for execution by at least one processor of a video game apparatus. The method comprises maintaining a virtual environment in memory, the virtual environment comprising a player-controlled game object and a second game object, the player-controlled game object being associated with a virtual display component. The method also comprises determining if the virtual display component satisfies a position condition relative to the second game object and, if so, obtaining preview information indicative of an interactive gameplay effect that would be carried out in the event of receipt of activation input via a game control interface and displaying the preview information in the virtual display component displayed on a screen.

In accordance with another aspect, this disclosure relates to a non-transitory computer-readable storage medium comprising computer-readable instructions which, when read and executed by at least one processor, cause the at least one processor to execute a method that comprises maintaining a virtual environment in memory, the virtual environment comprising a player-controlled game object and a second game object, the player-controlled game object being associated with a virtual display component. The method also comprises determining if the virtual display component satisfies a position condition relative to the second game object and, if so, obtaining preview information indicative of an interactive gameplay effect that would be carried out in the event of receipt of activation input via a game control interface and displaying the preview information in the virtual display component displayed on a screen.

In accordance with yet another aspect, this disclosure relates to a video game apparatus comprising at least one processor, a memory storing instructions for execution by the at least one processor and at least one input device configured to receive input from a player, at least one output device configured for providing output to the player. The at least one processor is configured to execute the instructions in the memory for implementing an interactive computer program that generates the output in response to the received input and, the interactive computer program including at least one process that comprises maintaining a virtual environment in memory, the virtual environment comprising a player-controlled game object and a second game object, the player-controlled game object being associated with a virtual display component. The process also comprises determining if the virtual display component satisfies a position condition relative to the second game object and, if so, obtaining preview information indicative of an interactive gameplay effect that would be carried out in the event of receipt of activation input via a game control interface and displaying the preview information in the virtual display component displayed on a screen.

These and other aspects of this disclosure will now become apparent to those of ordinary skill in the art upon review of a description of embodiments in conjunction with accompanying drawings.

BRIEF DESCRIPTION OF THE DRAWINGS

For a more complete understanding of the present disclosure, reference is now made to the following description taken in conjunction with the accompanying drawings, in which.

It should be appreciated that the drawings are for illustrative purposes in order to aid in understanding of certain embodiments, and are not intended to be limiting.

DETAILED DESCRIPTION

I. Video Game Apparatus

Figure 1A:
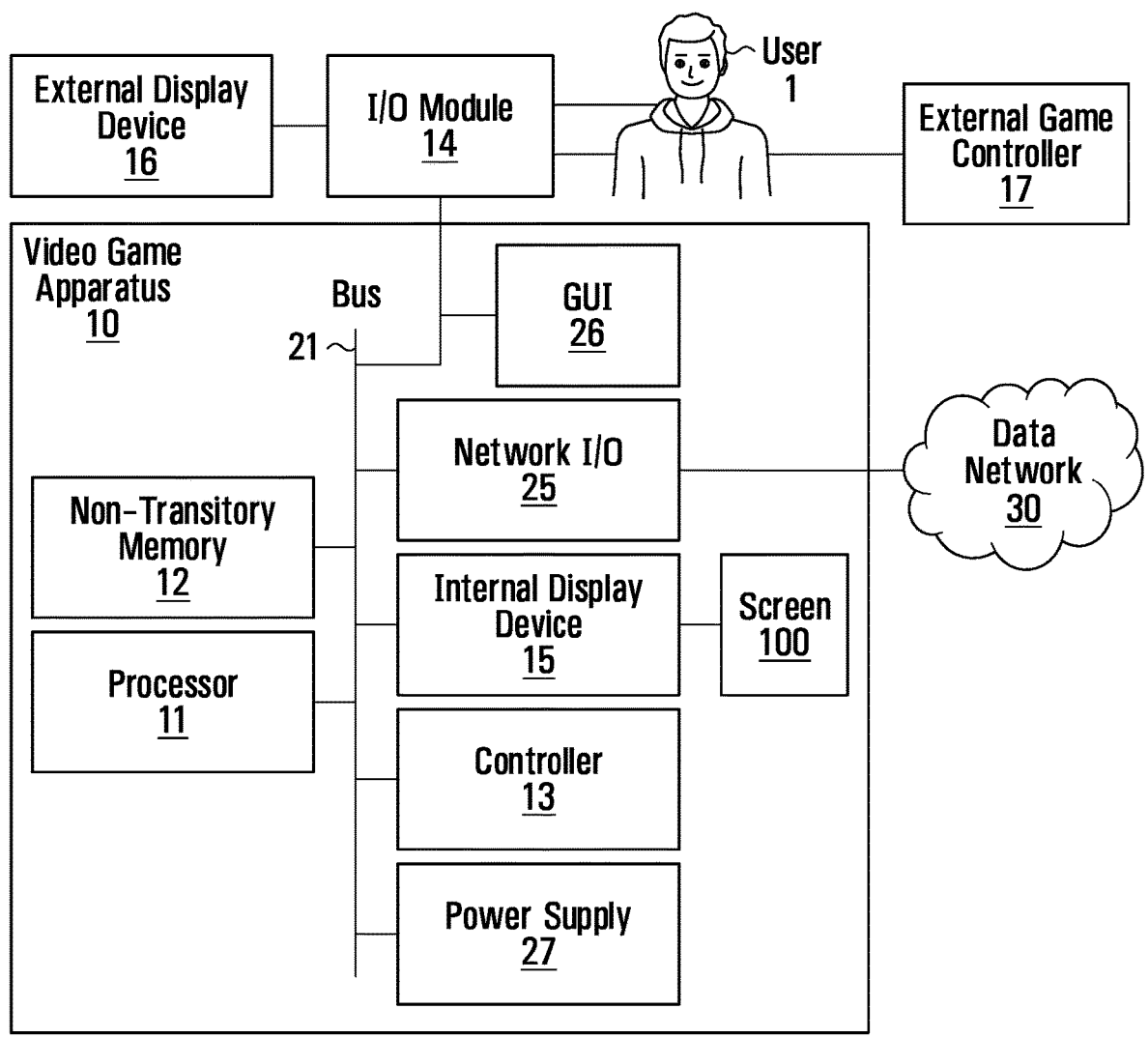
FIGS. 1A to 1D are block diagrams that illustrate various components and features of a video game apparatus for carrying out methods in accordance with various non-limiting embodiments of the present disclosure.

With reference to FIG. 1A, there is shown a video game apparatus 10. In some embodiments, the video game apparatus 10 is a dedicated gaming console similar to an Xbox™, Playstation™ or Nintendo™ gaming console. In other embodiments, the video game apparatus 10 is a laptop computer. In yet other embodiments, the video game apparatus 10 is a mobile device such as a smartphone, a tablet. In yet other embodiments, the video game apparatus 10 is a hand-held gaming console. The video game apparatus 10 may be any other computing device suitable for carrying out the embodiments of the disclosure.

The video game apparatus 10 comprises a non-transitory memory 12, at least one processor 11, an input/output module 14 and a power supply 27, among other components.

In some embodiments, the video game apparatus 10 has a game control interface configured to receive input from a player 1 (i.e., a user of the video game apparatus 10). The game control interface may comprise an internal game controller 13 (e.g. a touchscreen) and/or an external game controller 17 (e.g. a joystick). The video game apparatus 10 also has a display apparatus configured to display images for the player 1 to see. The display apparatus may comprise an internal display device 15 (e.g. a touchscreen) and/or an external display device 16 (e.g. a computer monitor, a television set).

The video game apparatus 10 may be connected to a data network 30 via a network input/output interface 25. Depending on the implementation, the data network 30 may be the internet, a local area network, a wireless network, a combination of such networks or still other forms of data networks.

The various components of the video game apparatus 10 may communicate with each other over one or more buses 21, which can be data buses, control buses, power buses and the like.

The player 1 may play a video game by viewing game images displayed on a screen 100 of the internal display device 15 or the external display device 16 and controlling aspects of the video game via the internal game controller 13 or the external game controller 17. Accordingly, the video game apparatus 10 receives inputs from the internal game controller 13 or the external game controller 17 via the input/output module 14. The video game apparatus 10 also supplies outputs to the internal display device 15 or the external display device 16 and/or an auditory device (e.g., a speaker, not shown) via the input/output module 14. In other implementations, there may be more than one internal or external game controller and/or more than one internal or external display device connected to the input/output module 14.

The at least one processor 11 may include one or more central processing units (CPUs) having one or more cores. The at least one processor 11 may also include at least one graphics processing unit (GPU) in communication with a video encoder/video codec (coder/decoder, not shown) for causing output data to be supplied to the input/output module 14 for display on the internal display device 15 or the external display device 16. The at least one processor 11 may also include at least one audio processing unit in communication with an audio encoder/audio codec (coder/decoder, not shown) for causing output data to be supplied to the input/output module 14 to the auditory device.

The memory 12 may include RAM (Random Access Memory), ROM (Read Only Memory), flash memory, hard disk drive(s), Flash Memory, EEPROM, Optical Disk and/or any other suitable memory device, technology or configuration. The memory 12 stores a variety of information including computer-readable instructions 18, game data 20 and an operating system 22.

When the video game apparatus 10 is powered on, the at least one processor 11 is configured to run a booting process which includes causing the at least one processor 11 to communicate with the memory 12. In particular, the booting process causes execution of the operating system 22. The operating system 22 may be any commercial or proprietary operating system suitable for the video game apparatus 10. Execution of the operating system 22 causes the at least one processor 11 to generate images displayed on the internal display device 15 or the external display device 16, including various options that are selectable by the player 1 via the internal game controller 13 or the external game controller 17, including the option for the player 1 to start and/or select a video game to be played. The video game selected/started by the player 1 is encoded by the computer-readable instructions 18.

The at least one processor 11 is configured to execute the computer-readable instructions 18 such that the at least one processor 11 is able to perform various kinds of information processing functions related to the video game that it encodes. In particular, and with reference to FIG. 1B, execution of the computer-readable instructions 18 causes the at least one processor 11 to execute a game data processing function 23 and game rendering function 24, which are now described.

The game rendering function 24 includes generation of a game image to be displayed on the internal display device 15 or the external display device 16. For its part, the game data processing function 23 includes processing of information representing progress of the game or a current state of the game (e.g., processing of information relating to the game that is not necessarily displayed on the internal display device 15 or the external display device 16). As such, the game data processing function 23 may sometimes be referred to herein as "game logic".

Figure 1B:
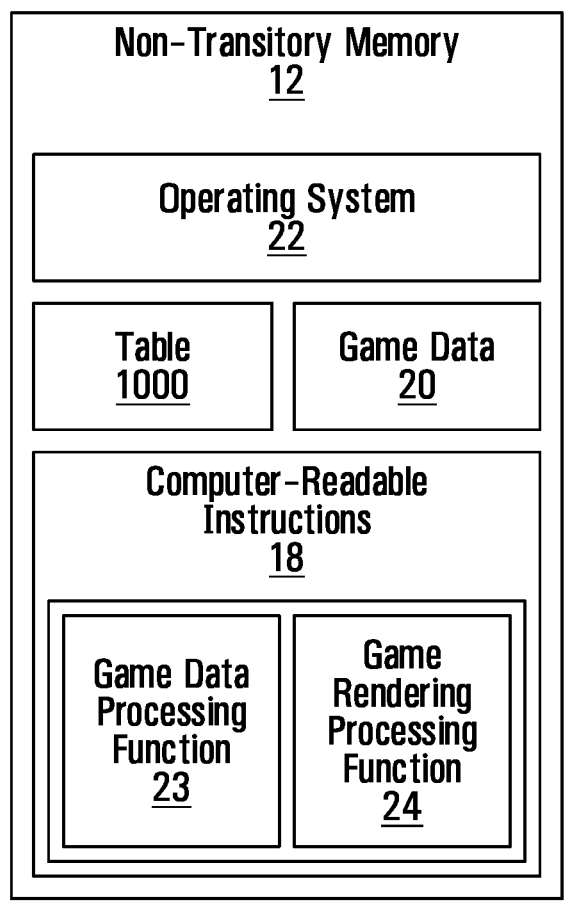

The game data processing function 23 and the game rendering function 24 are illustrated in FIG. 1B as forming part of a single set of computer-readable instructions 18. However, in other embodiments, the game data processing function 23 and the game rendering function 24 may be separate programs or sets of computer-readable instructions stored in separate memories and executed by separate, possibly distant, processors. For example, the game data processing function 23 may be performed on a CPU and the game rendering function 24 may be performed on a GPU.

Figure 1C:
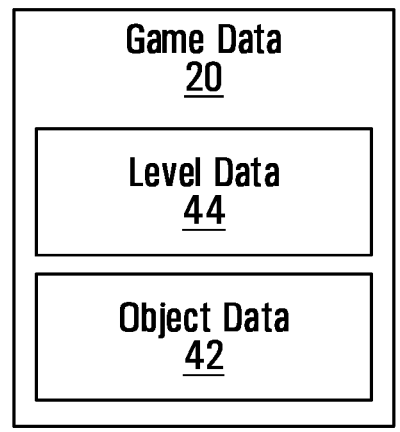

In the course of executing the computer-readable instructions 18, the at least one processor 11 manipulates constructs such as game objects and/or levels according to certain game rules and/or applying certain artificial intelligence algorithms. In the course of executing the computer-readable instructions 18, the at least one processor 11 creates, loads, stores, reads and generally accesses the game data 20, which includes data related to the game objects and/or levels. FIG. 1C shows an example illustrating examples of game data 20 according to a present example embodiment. The game data 20 may include data related to the aforementioned constructs and therefore may include object data 42 and/or level data 44.

A game object may refer to any element or portion of an element in a gaming environment that can be displayed graphically in a game image frame. Various types of game objects include a player character (PC), a non-player character (NPC), a player-controlled game object (such as a weapon) and an environment object, to name a few non-limiting possibilities. One game object may be associated with one or more other game objects, such as weapons held/controlled by a PC, or clothes donned by an NPC, or a formation of NPCs associated with a PC. A game object may have other non-visual representations such as numeric, geometric or mathematical representations. The object data 42 may store data relating to the current representation of a game object such as the graphical representation in a game image frame or a numeric, geometric or mathematical representation.

The object data 42 may store attributes of various game objects. In some cases, certain attributes of a game object may be controlled by the player 1. In other cases, certain attributes of a game object may be controlled by the computer-readable instructions 18. Non-limiting examples of attributes may include imaging data, position data, orientation data, material/texture data, color data, physical state data, visibility data, lighting data (e.g., direction, position, color and/or intensity), sound data, motion data, collision data, environment data, timer data and/or other data associated with the game object.

The game data 20 may also include data relating to the current view or camera angle of the video game (e.g., first-person view, third-person view, etc.) as displayed on the screen 100 of the internal display device 15 or the external display device 16 which may be part of the representations and/or attributes of the object data 42 and/or the level data 44.

In executing the computer-readable instructions 18, the at least one processor 11 may cause an initialization phase to occur after the player 1 has selected/started the game, causing initialization of the game. The initialization phase is used to carry out any necessary game setup and prepare the game data 20 for the start of the game. The game data 20 changes during the processing of the computer-readable instructions 18 (i.e., during the playing of the game) and the terminology "game state" is used herein to define the current state or properties of the game data 20 and hence the various object data 42 and/or the level data 44 and their corresponding representations and/or attributes.

After the initialization phase, the at least one processor 11, in the course of execution of the computer-readable instructions 18, may implement a "game loop". The game loop may include (i) the game data processing function 23 (or "game logic") being performed to process the player's input via the internal game controller 13 or the external game controller 17 and to update the game state (e.g., change data stored and maintained in the memory 12 regarding the gaming environment) and (ii) the game rendering processing function 24 being performed to cause the game image to be rendered based on the updated game state for display on the internal display device 15 or the external display device 16. The game loop may also track the passage of time to control the rate of gameplay.

The game loop runs continuously during gameplay causing the game data processing function 23 and the game rendering function 24 to be performed over and over again, but with a constantly changing game state.

It should be appreciated that parameters other than player inputs can influence the game state. For example, various timers (e.g., elapsed time, time since a particular event, virtual time of day, etc.) can have an effect on the game state. In other words, the game keeps progressing even when the player 1 does not provide input, and as such, the game state may be updated in the absence of the player's input.

In general, the number of times that the game data processing function 23 is performed per second specifies the game state update rate (hereinafter "updates per second") and the number of times that the game rendering function 24 is performed per second specifies game image rendering rate (hereinafter "frames per second"). It should be appreciated that the target number of frames per second may be more or less than 25 frames per second (e.g., 30 or 60 frames per second); however, it may be desired that the game data processing function 23 and the game rendering processing function 24 be performed not less than 20 to 25 times per second lest the human eye notice any lag in the rendering of the game image frames. Naturally, the higher the frame rate, the less time between images and the more power is required of the processor(s) to execute the game loop.

The game data processing function 23 and the game rendering function 24 may be called the same number of times per second, although this is not a requirement. By way of a specific and non-limiting example, it may be desirable to perform the game data processing function 23 and the game rendering function 24 every 40 milliseconds (ms) (i.e., 40 ms=1 second/25 frames per second—FPS). In the case where the game data processing function 23 is followed by the game rendering function 24, it should be appreciated that, for a given cycle or period, both the game data processing function 23 and the game rendering function 24 would need to be performed in the allotted time for that period. Depending on the current game state, it should be appreciated that the time required to perform the game data processing function 23 and/or the game rendering function 24 may vary. If both the game data processing function 23 and the game rendering function 24 together take less than the allotted time, a sleep timer may be used before performing the next cycle of the game data processing function 23 and the game rendering function 24. However, if the game data processing function 23 and the game rendering function 24 together take more than the allotted time to perform, this may cause jitter. One technique to avoid jitter is to occasionally omit performing the game data processing function 23 or the game rendering function 24.

In other embodiments, the game data processing function 23 and the game rendering function 24 may be independently executed processes, i.e., not part of the same game loop. In such cases, the game data processing function 23 may be routinely performed at a specific rate (i.e., a specific number of updates per second) regardless of when the game rendering function 24 is performed and the game rendering function 24 may be routinely performed at a specific rate (i.e., a specific number of frames per second) regardless of when the game data processing function 23 is performed.

It should be appreciated that the process of routinely performing the game data processing function 23 and the game rendering function 24 may be implemented according to various techniques within the purview of the person skilled in the art. The techniques described in this document are simply non-limiting examples of how the game data processing function 23 and the game rendering processing function 24 may be performed.

As part of performing the game data processing function 23, the player input received via the internal game controller 13 or the external game controller 17 (if any) and the game data 20 are processed. More specifically, as the player 1 plays the video game, the player 1 inputs various commands via the internal game controller 13 or the external game controller 17 such as move left, move right, move front, move back, jump, shoot, to name a few examples. In response to the received player input, the game data processing function 23 may update the game data 20. In other words, the object data 42 and/or the level data 44 may be updated in response to player input received via the internal game controller 13 or the external game controller 17.

It should be appreciated that on some occasions when the game data processing function 23 is performed, there may not be any player input received via the internal game controller 13 or the external game controller 17.

Regardless of whether or not player input is received, the game data 20 is processed and may be updated. Such updating of the game data 20 may be in response to representations and/or attributes of the object data 42 and/or the level data 44 as the representations and/or attributes may specify updates to the game data 20. For example, timer data may specify one or more timers (e.g., elapsed time, time since a particular event, virtual time of day, etc.), which may cause the game data 20 (e.g., the object data 42 and/or the level data 44) to be updated. By way of another example, objects not controlled by the player 1 may collide (bounce off, merge, shatter, etc.), which may cause the game data 20 e.g., the object data 42 and/or the level data 44 to be updated in response to a collision.

In general, the game data 20 (e.g., the representations and/or attributes of the objects and/or levels) represents data that specifies a three-dimensional (3D) graphics scene of the game. The process of converting a three-dimensional (3D) graphics scene, which may include one or more 3D graphics objects, into two-dimensional (2D) rasterized game image for display on the internal display device 15 or the external display device 16 is generally referred to as rendering and is carried out by the game rendering function 24.

Figure 1D:

FIG. 1D illustrates an example of a process of converting a 3D graphics scene to a game image for display on the internal display device 15 or the external display device 16 via the screen 100. At step 52, the game rendering function 24 processes the data that represents the three-dimensional (3D) graphics scene of the game and converts this data into a set of vertex data (also known as a vertex specification). The vertex data is suitable for processing by a rendering pipeline (also known as a graphics pipeline). At step 55, the game rendering function 24 processes the vertex data according to the rendering pipeline. The output of the rendering pipeline is typically pixels for display on the internal display device 15 or the external display device 16 via the screen 100 (step 60).

More specifically, at step 52, the 3D graphics objects in the graphics scene may be subdivided into one or more 3D graphics primitives. A primitive may refer to a group of one or more vertices that are grouped together and/or connected to define a geometric entity (e.g., point, line, polygon, surface, object, patch, etc.) for rendering. For each of the 3D graphics primitives, vertex data is generated at this step. The vertex data of each primitive may include one or more attributes (e.g., position, the color, normal or texture coordinate information, etc.). In deriving the vertex data, a camera transformation (e.g., rotational transformations) may occur to transform the 3D graphics objects in the 3D graphics scene to the current view or camera angle. Also, in deriving the vertex data, light source data (e.g., direction, position, color and/or intensity) may be taken into consideration. The vertex data derived at this step is typically an ordered list of vertices to be sent to the rendering pipeline. The format of the ordered list typically depends on the specific implementation of the rendering pipeline.

At step 55, the game rendering function 24 processes the vertex data according to the rendering pipeline. Non-limiting examples of known rendering pipelines include OpenGL and DirectX. Regardless of the specific rendering pipeline used to implement the rendering pipeline, the general process of the rendering pipeline is to create a 2D raster representation (e.g., pixels) of a 3D scene. The rendering pipeline in general calculates the projected position of the vertex data in to 2D screen space and performs various processing which may take into consideration lighting, colour, position information, texture coordinates and/or any other suitable process to derive the game image (e.g., pixels) for output on the internal display device 15 or the external display device 16 (step 60).

Therefore, in summary, the computer-readable instructions 18, when executed, cause the video game apparatus 10 to (i) maintain a virtual environment comprising various game objects; (ii) track attributes of the game objects in the virtual environment; (iii) render images for display based on the game objects in the virtual environment and one or more camera perspectives; (iv) be attentive to input from the player; and (v) respond to the input by making changes to the attributes of the game objects in the virtual environment, as encoded in the game logic. These actions are continually repeated, and the player interactions with the video game apparatus 10 are known as gameplay. In many cases, the game logic provides a progression (e.g., in the form of a score, level or power), which motivates the player 1 to continue playing or play again.

II. Shooting Video Game

The game logic and virtual environment may vary widely, and together they give each game its unique gameplay characteristics. One broad class of games is "shooting" video games in which gameplay includes the player 1 aiming a weapon at a target and shooting. In such games, gameplay may be advanced by successfully hitting targets in order to accumulate points or increase a score. The game logic may impose constraints that the player 1 must respect in order to advance gameplay. The broad class of shooting games can be broken down into sub-classes, two examples of which are first-person shooter (FPS) games and third-person shooter (TPS) games. In a typical FPS game, the player 1 views game objects in the virtual environment from a vantage point of a player character (PC) in the virtual environment. In a typical TPS game, the player 1 views game objects in the virtual environment from a vantage point of a sideline observer with the ability to remotely control an avatar representing a PC in the virtual environment.

Although TPS games are not excluded, the present disclosure will be described as being applied to an FPS game. Accordingly, the game logic is configured to construct a scene from a vantage point of a player character (PC). The scene includes a variety of game objects in the virtual environment, including one or more player-controlled game objects, non-player characters (NPCs) and environment objects; the environment objects can be "interactive" or "non-interactive", as described later on in greater detail.

Figure 2A:
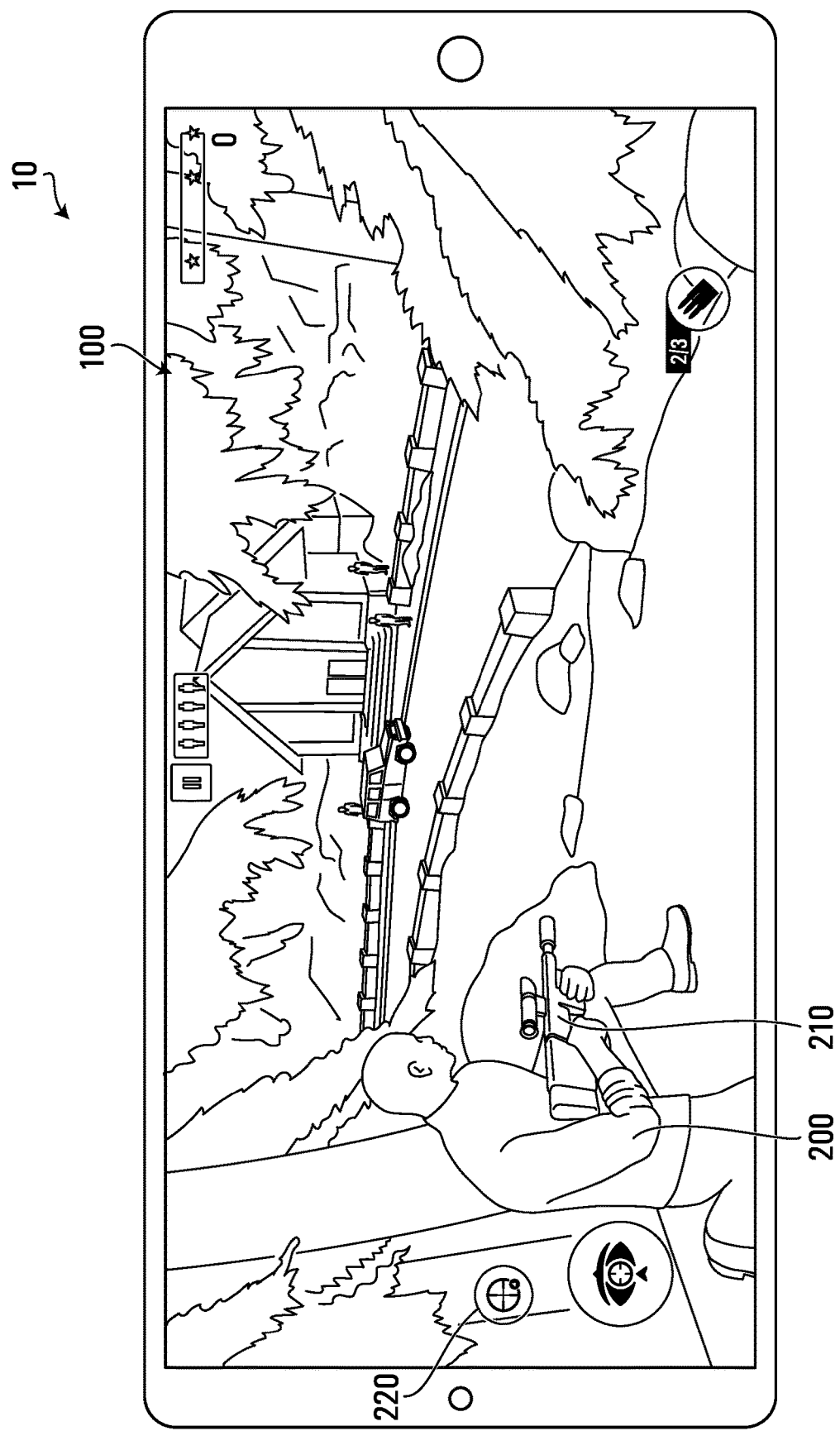
FIG. 2A shows a scene rendered on a screen of the video game apparatus, from the vantage point of a player-controlled game object.

FIG. 2A shows a scene that may be caused to be rendered on a player's screen 100 by execution of the computer-readable instructions. The scene includes an anthropomorphized playing character 200 and a variety of game objects, which are shown from a vantage point slightly behind and to the right of the PC (when facing in the same direction as the PC). As such, the player 1 sees, on the screen 100, substantially the same perspective of the scene as anthropomorphized playing character would be expected to "see".

One of the game objects in the virtual environment is a player-controlled game object, in this case a virtual gun 210. The virtual gun 210 is associated with a position (e.g., spatial coordinates) and/or an orientation (e.g., a direction where it is pointing/aiming) in the virtual environment. The position and orientation of the virtual gun 210 are tracked and maintained in memory.

Another one of the game objects in the virtual environment is a virtual display component associated with the player-controlled game object (i.e., the virtual gun 210). In this case, the virtual display component is a scope window associated with the virtual gun 210. The scope window may be enabled (e.g., caused to appear) by providing an input that is detected as a scope enabling input by the video game program. An example of an input that may be detected as a scope enabling input may include tapping somewhere in the scene, or selecting a predefined scope enable button 220, while the scope window is not yet enabled.

Figure 2B:
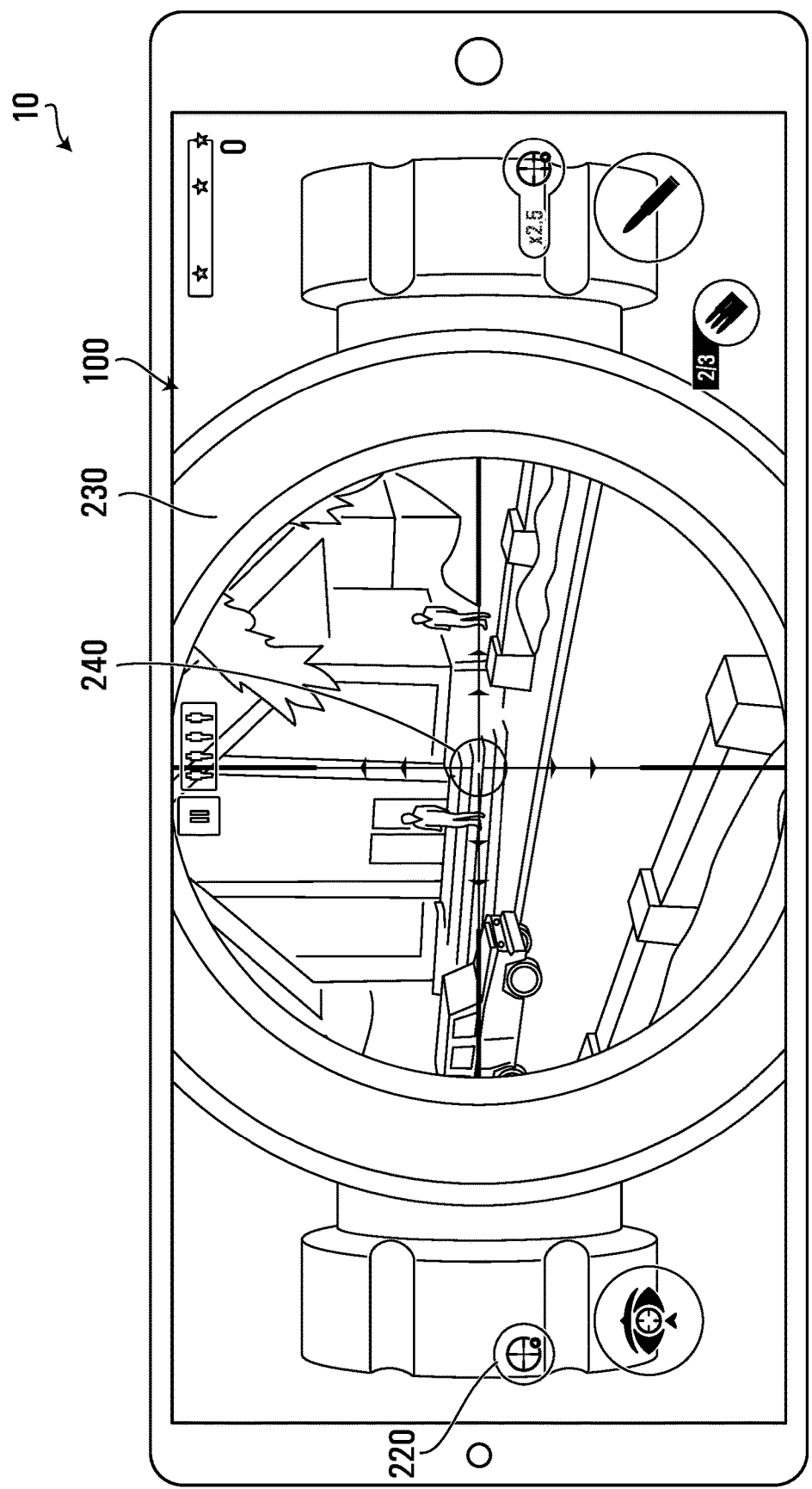
FIGS. 2B and 2C show respective magnified sub-portions of the scene for different orientations of the player-controlled game object.

FIG. 2B shows an example of the scope window 230 having been enabled, e.g., according to one of the above-mentioned procedures. There is no particular limitation on the size or shape of the scope window 230. In this non-limiting example, the scope window 230 is circular so as to emulate the circular window of some rifle scopes. In other examples, the scope window 230 may be rectangular, oval, etc. In this non-limiting example, the scope window 230 takes up approximately between 40% and 60% of the area of the screen 100 on the video game apparatus 10 as seen by the player 1. In other examples, the scope window may take up between 1% and 20%, between 20% and 40%, between 60% and 80% or between 80% and 100% of the area of the screen 100 when enabled.

The scope window 230 depicts a magnified sub-portion of the scene from the vantage point of the PC 200, allowing the player 1 to see the sub-portion of the scene in more detail. As such, the scope window 230 can be considered a "zoom in" on a particular sub-portion of the scene. The magnified sub-portion may have as its center an "aiming zone" 240. The aiming zone may also be delimited by a reticle or crosshairs 250. The aiming zone 240 may constitute a point or a disk, for example. The aiming zone 240 may be inherently defined by the center of the reticle or crosshairs without being visually represented on the screen 100.

In this particular embodiment, the position of the virtual gun 210 in the virtual environment is fixed, but this need not be the case in all embodiments. Also, in this particular embodiment, the orientation of the virtual gun 210 can be changed by the player 1 providing a first type of input (referred to as "navigation input") via the scope window 230. Specifically, such navigation input is received from the player 1 via the game control interface 13, 17, such as a touchscreen or keyboard. For example, in one non-limiting embodiment, navigation input may be provided by dragging, swiping or tapping the screen 100. In other non-limiting embodiments, navigation input may be provided via soft keys, keyboard keys, a mouse, voice commands or gestures.

Figure 2C:
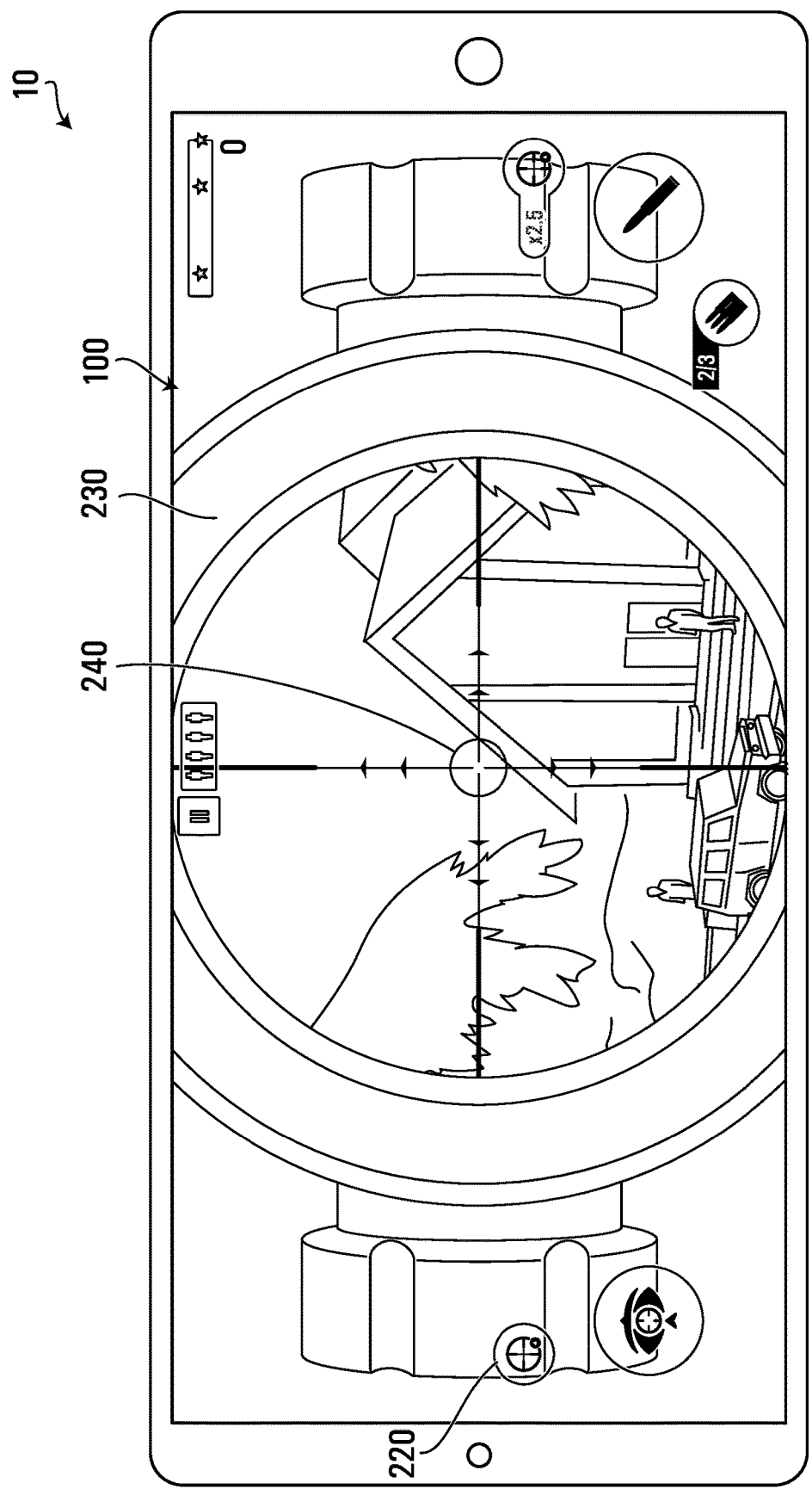

FIGS. 2B and 2C show different orientations of the virtual gun 210 relative to the scene of FIG. 2A, whereby it is seen that the aiming zone 240 in each case includes a different magnified portion of the original scene. In this case, the game logic may only allow control of the virtual gun's orientation (e.g., as manifested by the center of the aiming zone 240). As such, the player 1 may cause positioning of the aiming zone 240 over different subsets of the scene corresponding to different groups of game objects, including non-playing characters, non-interactive environment objects and interactive environment objects. The position of the center of the aiming zone 240 and/or the limits of the magnified sub-portion of the scene may be stored in the memory as part of the game data 20.

Once it is enabled, the scope window 230 may subsequently be disabled by the player 1 providing an input that is detected as a scope-disabling input by the at least one processor 11. An example of an input that may be detected as a scope-disabling input may include tapping the screen 100 somewhere in the scene, or selection of the predefined scope enable button 220, while the scope window 230 is enabled. In other embodiments, the game logic may consider that pressing a dedicated key is a scope-disabling input. Disabling the scope window 230 may involve returning to a view of the scene comparable to that of FIG. 2A.

In addition to the aforementioned navigation input, a second type of input, referred to as "activation input", may also be received from the player 1 via the game control interface 13, 17. For example, the at least one processor 11 may be configured to recognize player input as "activation input" in the event that the player 1 taps or swipes a designated area on the touchscreen or presses a designated soft key or designated keyboard sequence. In the case wherein the player-controlled game object is a virtual gun (such as the virtual gun 210), the activation input is provided by the player 1 when the player 1 wishes to fire (or shoot) the virtual gun. An external controller with a trigger may also be utilized in some embodiments for providing the activation input.

It is contemplated that recognition of player input as activation input may be restricted to instances where the virtual display component (in this case, the scope window 230) has been enabled. However, this is not to be considered a requirement, as in other embodiments the virtual gun 210 may be fired without the ability to view the scope window 230.

Assuming that the virtual display component (in this case, the scope window 230) has indeed been enabled (as in FIGS. 2B and 2C), it will be appreciated that due to the magnification effect of the virtual display component, the player 1 is provided with more visual detail in a particular sub-portion of the scene, allowing more precise positioning of the aiming zone 240 through the provision of navigation input before the activation input is ultimately provided. This can lead to greater enjoyment and faster progress through the video game.

The game logic may be configured to respond to receipt of the activation input in various ways, such as by potentially changing a state of one or more game objects in the virtual environment.

For example, a game object that occupies a position coinciding with that of the aiming zone 240 (e.g., when a portion of that game object is at the center of the crosshairs) at the time the activation input is provided (or received) may be considered "hit" (or "shot"). The game logic may carry out a wide range of effects in response to the game object being hit further to receipt of the activation input. These effects depend on a variety of factors, such as the type of game object that was hit and its position in the virtual environment relative to other objects.

Figure 3:
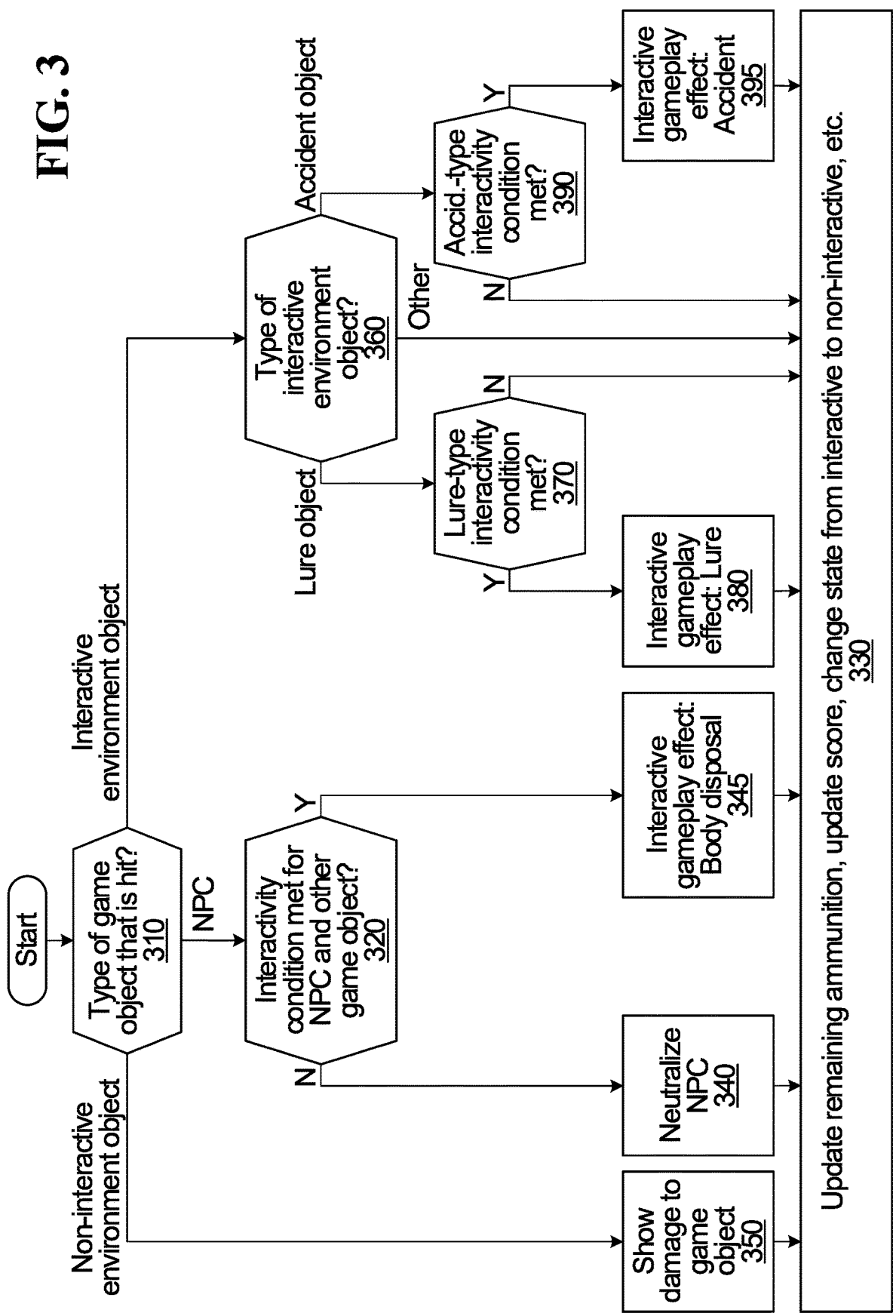
FIG. 3 is a flowchart illustrating various possible gameplay effects that may be carried out further to receipt of activation input from the player.

In particular, since a game object that may be hit can be an NPC, an interactive environment object or a non-interactive environment object, the game logic may accordingly be configured such that different effects may arise in each case. This is now described with reference to the flowchart in FIG. 3, which may be executed by the game logic in response to the receipt of activation input while the virtual gun 210 is aimed at the game object in question.

Specifically, at step 310, a determination is made as to whether the object that has been hit is an NPC, an interactive environment object or a non-interactive environment object. If it is an NPC, the next step is 320, if it is an interactive environment object, the next step is step 360 and if it is a non-interactive environment object, the next step is step 350.

At step 350, i.e., in the case of a non-interactive environment object being hit, the game logic may be configured to graphically show damage to the non-interactive environment object and/or a change in color and/or a change in size. In some cases, the game logic may be configured to remove the non-interactive environment object from the game objects displayed in the scene, possibly after showing obliteration of the non-interactive environment object. The next step is step 330, where certain data elements associated with the player-controlled game object are changed. An example of such a data element could be an amount of remaining ammunition, which could be decremented after the shot is taken. In addition, at step 330, the player's score may also be changed, depending on a variety of factors and conditions.

In the case of an NPC being hit, this may result in occurrence of a specific interactive gameplay effect if an "interactivity condition" for the NPC and a certain type of interactive environment object is met. Specifically, in the case of an NPC being hit, step 310 is followed by step 320, whereby an interactivity condition is verified for the NPC and at least one interactive environment object. In a non-limiting example, the interactive environment object is a "concealment object". Non-limiting examples of a concealment object include a virtual bush, bin, wall, well, door, vehicle, pit, a container, a body of water or snowbank. As such, the at least one processor 11 may verify whether a "concealment"-type interactivity condition, involving the NPC and a concealment object, has been met.

The concealment-type interactivity condition may be based on a distance between the NPC (that was hit) and the concealment object that is closest to the NPC. For example, if the NPC is considered "too far" from the nearest concealment object (e.g., the distance between the NPC and the nearest concealment object is greater than a threshold distance), then step 320 proceeds to step 340, whereby the game logic may be configured to respond to the NPC being hit by damaging or neutralizing (e.g., killing) the NPC. Step 340 may also involve replacing the NPC with a "virtual corpse" game object that is displayed in the scene at the location where the NPC was hit.

However, if at step 320 the concealment-type interactivity condition for the NPC and the nearest concealment object is met, that is to say if the NPC is considered "sufficiently close" to the nearest concealment object (e.g., the distance between the NPC and the nearest concealment object is less than the aforementioned threshold distance), then step 320 proceeds to step 345, whereby the game logic may be configured to carry out an interactive gameplay effect referred to as "body disposal".

Specifically, the game logic may be configured to respond to the NPC being hit by hiding (totally or partially) the NPC with the concealment object. For example, if the concealment object is a bush or a wall, the NPC may be rendered as falling behind the bush or the wall. Alternatively, if the concealment object is a cargo van, the NPC may be rendered as disappearing inside the cargo van.

After either step 340 or step 345, the next step is step 330, where certain data elements associated with the player-controlled game object are changed, as previously described. An example of such a data element could be an amount of remaining ammunition, which could be decremented after the shot is taken. In addition, at step 330, the player's score may also be changed, depending on a variety of factors and conditions. For example, if body disposal took place, then additional points may be awarded, and the player's score may also be changed depending on, for example, the distance between the NPC and the concealment object when the activation input was provided by the player.

Finally, in the case of an interactive environment object being hit (output of step 310 leading to step 360), the game logic is configured to verify whether an "interactivity condition" is satisfied for the interactive environment object and at least one NPC. Different types of interactivity conditions pertain to different types of interactive environment objects (step 360).

For example, an interactive environment object may be a "lure" object, and the interactivity condition that involves a lure object may be referred to as a "lure"-type interactivity condition. Non-limiting examples of a lure object include breakable glass, or any other object which, when shot, would create an audible or visual effect that would attract the attention of a nearby NPC.

To take another example, an interactive environment object may be an "accident" object and an interactivity condition that involves an accident object may be referred to as an "accident"-type interactivity condition. Non-limiting examples of accident objects may include a heat lamp, an explosive pipe, an icicle or any other object which, when shot, would cause harm, damage or death to a nearby NPC.

Thus, step 360 has multiple branches, depending on the type of interactive environment object that was hit, which leads to different types of interactivity conditions being verified, as will be described below.

Interactive Environment Object that is Hit is a Lure Object

If step 360 determines that the interactive environment object that was hit is a lure object (as discussed above), the next step is step 370, whereby a lure-type interactivity condition is verified for the lure object and at least one NPC.

The lure-type interactivity condition may be based on a "lure zone" around the lure object and whether there are any NPCs in the lure zone. In a simple case, the lure zone may be a circular disk around the lure object. The lure zone may extend to an area above the NPC in the virtual environment. In a more complex case, the lure zone may take into account obstacles and terrain, so as to circumscribe an irregular perimeter in the vicinity of the lure object. The extent and/or limits and/or coordinates of the lure zone are maintained in memory in association with the lure object.

The game logic may then be configured to respond to a lure object being hit by causing any NPCs in the lure zone (referred to as "affected" NPCs) to change position, direction, speed, acceleration, etc. at step 380. In accordance with step 380, the affected NPCs (if any) in the lure zone may be caused to move in a direction towards the lure object. This interactive gameplay effect may thus be referred to as a "lure".

As an interactive gameplay effect, a lure may improve the probability that one or more of the affected NPCs, by having changed course, will enter or coincide with the aiming zone 240 of the virtual gun 210, which may present an opportunity for the player 1 to provide an activation input so as to fire the virtual gun 210 and hit the affected NPC(s) directly.

After completion of step 380, or if step 370 assesses that the lure-type interactivity condition is not met by the lure object and any NPC, the game logic proceeds to step 330. As described above, step 330 may involve changing certain data elements associated with the player-controlled game object. An example of such a data element could be an amount of remaining ammunition, which could be decremented after the shot is taken. In addition, at step 330, the player's score may also be changed, depending on a variety of factors and conditions.

Interactive Environment Object that is Hit is an Accident Object

If step 360 determines that the interactive environment object that was hit is an accident object (as discussed above), the next step is step 390, whereby an accident-type interactivity condition is verified for the accident object and at least one NPC.

The accident-type interactivity condition may be based on an "accident zone" around the accident object and whether there are any NPCs in the accident zone. In a simple case, the accident zone may be a circular disk around the accident object. In another simple case, the accident zone may include a space directly below the accident object where the accident object may fall under the influence of a simulated gravitational force. The accident zone may extend to an area above the NPC in the virtual environment. In a more complex case, the accident zone may take into account obstacles and terrain, so as to circumscribe an irregular perimeter in the vicinity of the accident object. The extent and/or limits and/or coordinates of the accident zone are maintained in memory in association with the accident object.

The game logic may then be configured to respond to an accident object being hit by causing any NPCs in the accident zone (referred to as "affected" NPCs) to be neutralized, damaged or killed, as collateral damage to the accident object being hit. This interactive gameplay effect may thus be referred to as an "accident".

After completion of step 395, or if step 390 assesses that the accident-type interactivity condition is not met by the targeted accident object and any NPC, the game logic proceeds to step 330. As described above, step 330 may involve changing certain data elements associated with the player-controlled game object. An example of such a data element could be an amount of remaining ammunition, which could be decremented after the shot is taken. In addition, at step 330, the player's score may also be changed, depending on a variety of factors and conditions.

It should be appreciated that in response to one of the above interactive environment objects (e.g., lure object or accident object) being hit, such interactive environment object may cease to be interactive, i.e., it may become a non-interactive environment object. It may also undergo other changes in state. Such changes may be carried out as part of step 330.

Finally, it is possible that the game object that was hit is an interactive environment object but is neither a lure object nor an accident object (e.g., a concealment object). In that case, there need not be any resulting gameplay effect, and the game logic may simply proceed directly from step 360 to step 330.

Those skilled in the art will appreciate from the above that what makes an environment object "interactive" is the fact that if an interactivity condition involving that environment object and an NPC is satisfied, an interactive gameplay effect may arise. However, interactivity of that environment object may arise due to it having been shot in proximity to an NPC (e.g., lure object or accident object), or due to it being in proximity to an NPC that is shot (e.g., concealment object). More specifically, the above interactive gameplay effects (body disposal at step 345, luring at step 380 and accident at step 395) show an interaction between an interactive environment object (e.g., concealment object, lure object, accident object) on the one hand, and an NPC on the other, provided the corresponding type of interactivity condition (e.g., concealment-type, lure-type, accident-type) is satisfied.

Each type of interactivity condition (e.g., concealment-type interactivity condition verified at step 320, lure-type interactivity condition verified at step 370, accident-type interactivity condition verified at step 390) may check for additional factors, which can be combined using Boolean operators to indicate whether an overall interactivity condition is satisfied. Such additional factors may include the relative orientation of an NPC and an interactive environment object, attributes (e.g., powers) of an NPC (as stored in the memory 12), whether the player 1 has paid for access to interactivity, the degree of difficulty or game level, etc.

Therefore, in summary, interaction between the two game objects (one of which is an NPC and the other of which is an interactive environment object) results in an interactive gameplay effect, examples of which include "body disposal" (which results in an NPC disappearing if it is shot in proximity to a concealment object), "lure" (which causes an NPC in a lure zone of a lure object to move potentially into the crosshairs of a virtual gun further to firing at the lure object); or "accident" (which occurs when an NPC in an accident zone of an accident object is neutralized, damaged or killed by firing at the accident object). Other gameplay effects are of course possible.

It will thus be appreciated that each interactive gameplay effect is associated with a corresponding interactivity condition and vice versa. Of course, other types of interactive environment objects and interactivity conditions may be devised and designed by those of skill in the art.

III. Tactical Assistance Process

Figure 4A:
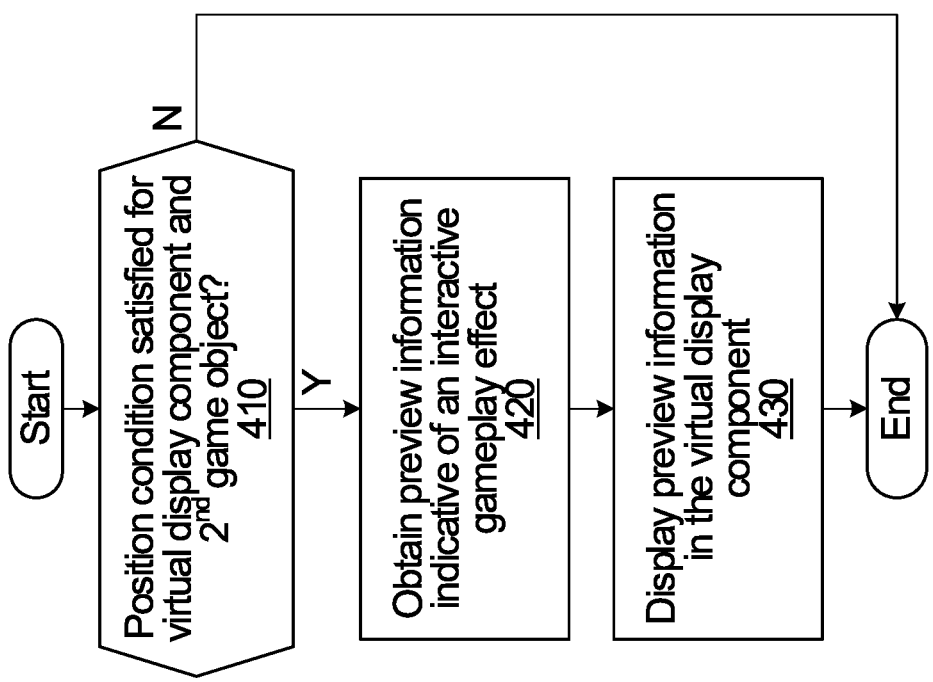
FIGS. 4A and 4B are flowcharts illustrating a tactical assistance process in accordance with a non-limiting embodiment.

In accordance with embodiments of the present disclosure, the at least one processor 11 carries out a tactical assistance process as part of the game logic in order to assist the player 1 in achieving progress in the game. According to the tactical assistance process, and with reference to FIG. 4A, the processor is configured to determine, at step 410, if the virtual display component associated with the player-controlled game object satisfies a "position condition" relative to a second game object within the virtual environment. If the position condition is indeed satisfied, then at step 420 of the tactical assistance process, the at least one processor 11 is configured to obtain "preview information" indicative of an interactive gameplay effect that would be carried out in the event of receipt of activation input. At step 430, the at least one processor 11 is configured to cause the preview information obtained at step 420 to be displayed in the virtual display component, with the virtual display component being displayed on a screen.

In one non-limiting example of implementation, the position condition verified at step 410 may be met in the event that activation input received from the player 1 would result in the second game object being hit. In a specific non-limiting example, the player-controlled game object is the virtual gun 210, the virtual display component associated with the virtual gun 210 is the scope window 230 with an aiming zone 240. In this case, the position condition verified at step 410 may be satisfied if the aiming zone 240 of the virtual gun 210 coincides with a part of the second game object, or if the center of the aiming zone is less than a threshold distance away from the closest part of the second game object.

The preview information that is displayed in the virtual display component at step 430 may be shown in the vicinity of the aiming zone 240 so that the player 1 is able to learn of the interactive gameplay effect while remaining focused on positioning the aiming zone 240 of the virtual gun 210 in a desired way. The preview information that is displayed in the virtual display component at step 430 may be color-coded to the type of interactive game effect (e.g., body disposal in white, lure in blue, accident in red).

Figure 4B:
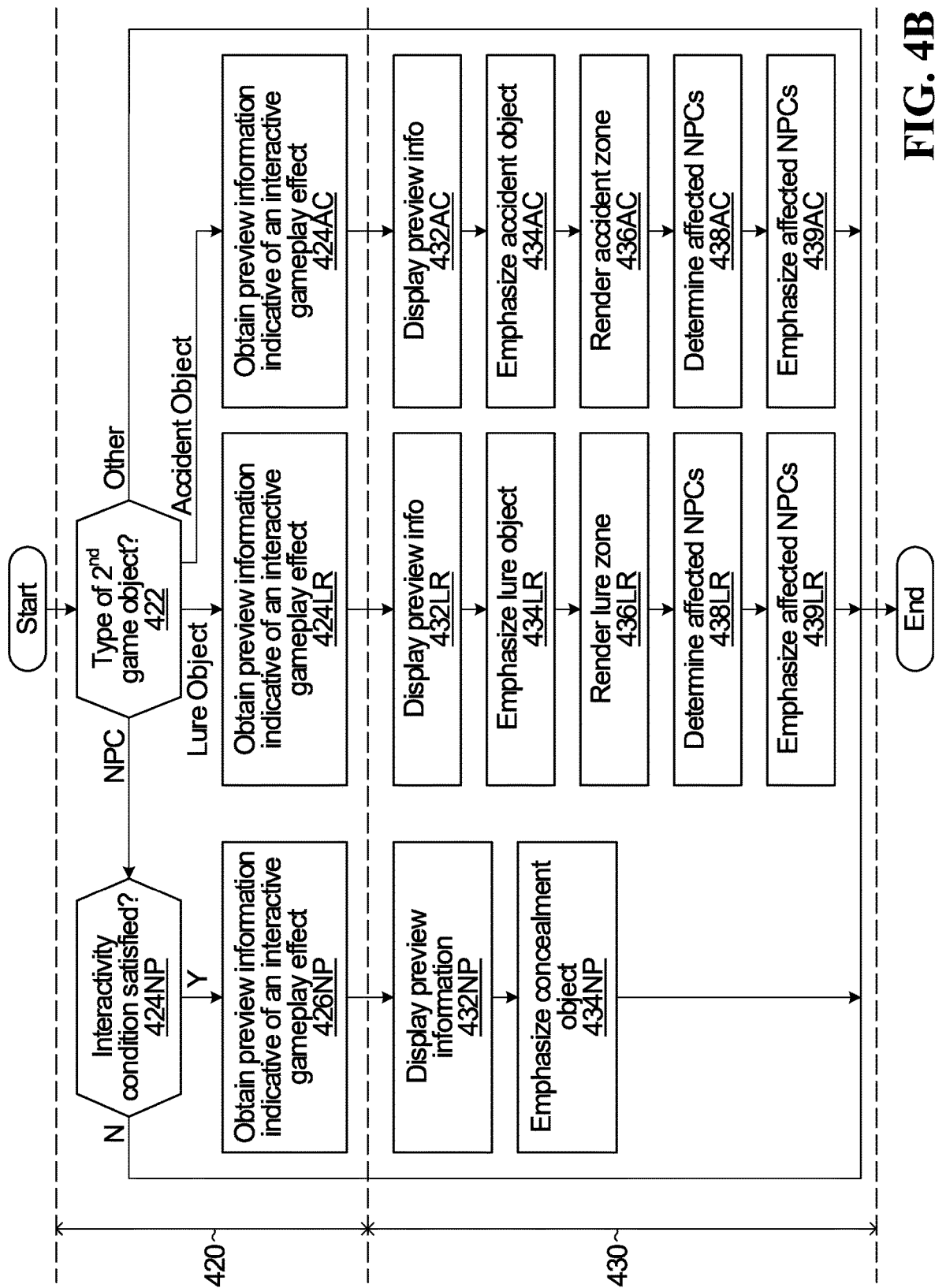

The second game object can be a non-player character (NPC) or an environment object. The tactical assistance process may have additional complexity, depending on whether the second game object is an NPC or a certain type of interactive environment object (e.g., lure object or accident object). This is now described in greater detail with reference to FIG. 4B, which represents additional detail around steps 420 and 430 of the tactical assistance process of FIG. 4A. As such, referring to the flowchart of FIG. 4B, at step 422, the at least one processor 11 determines if the second game object is an NPC, a certain type of interactive environment object, or neither of these.

If the second game object is an NPC, the tactical assistance process proceeds to step 424NP; if the second game object is a lure object, the tactical assistance process proceeds to step 424LR and if the second game object is an accident object, the tactical assistance process proceeds to step 424AC. In all other cases, the tactical assistance process exits. Of course, lure objects and accident objects are merely two non-limiting example types of interactive environment objects that may be associated with an interactive gameplay effect, and other types of interactive environment objects may be designed.

Step 424NP: Second Game Object is an NPC

In case the second game object is an NPC, the method may further comprise determining, at step 424NP, if an interactivity condition involving the NPC and a certain type of interactive game object (e.g., a concealment object) is satisfied. If the interactivity condition is satisfied, the tactical assistance process obtains the preview information at step 426NP, and then proceeds to step 432NP where the at least one processor 11 causes the virtual display component to display the preview information so obtained. If step 424NP reveals that the interactivity condition is not satisfied, the tactical assistance process exits.

It is therefore envisaged that the causing of the display of preview information, which occurs at step 432NP, may be carried out only if the interactivity condition verified at step 424NP is indeed satisfied. The interactivity condition may be the concealment-type interactivity condition, described earlier, which may be satisfied if the NPC is within a threshold distance of the concealment object, for example. Other metrics for determining whether the concealment-type interactivity condition is satisfied are of course possible.

The interactive gameplay effect that would be carried out in the event of receipt of activation input is "body disposal", as described above. In particular, if activation input were to be received, i.e., if the NPC were shot, the NPC would be hidden by the concealment object, giving the impression that the body has disappeared. As such, the preview information obtained at step 426NP may include an indication of the interactive gameplay effect and the concealment element.

Figure 5A:
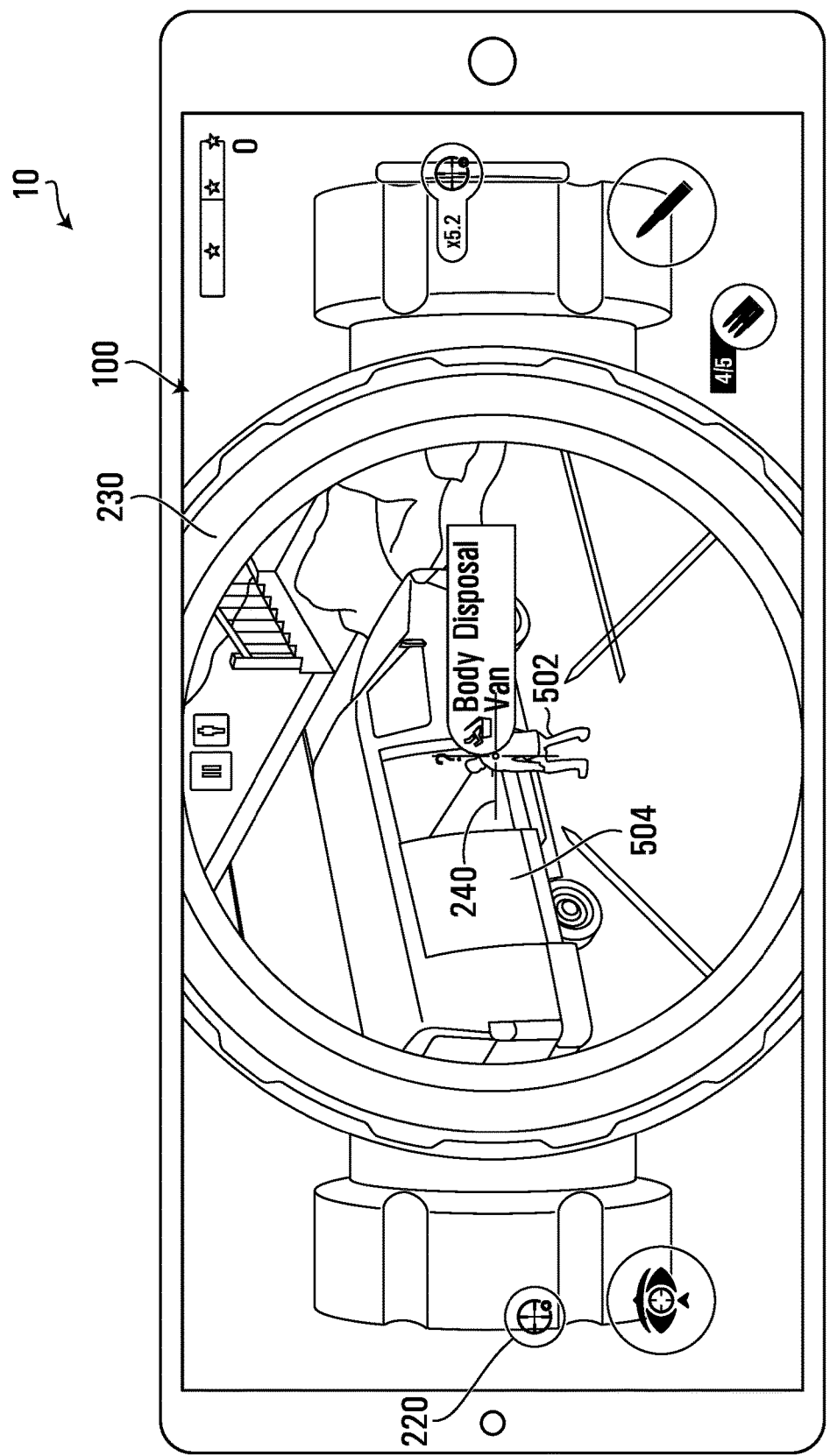
FIGS. 5A and 5B are example screen shots showing display of preview information in a scope window, the preview information being indicative of an interactive gameplay effect referred to as a body disposal.

In a first non-limiting example, with reference to FIG. 5A, consider the case where the virtual gun 210 is aimed at an NPC 502 (i.e., such that the position condition is satisfied with respect to the NPC 502). Also consider that a concealment-type interactivity condition is satisfied for the NPC 502 and a concealment object that is, in this case, an open cargo van door 504. Here, the tactical assistance process may determine, at step 426NP, that the preview information is "BODY DISPOSAL". To be even more precise, the tactical assistance process may determine, at step 426NP, that the preview information is "BODY DISPOSAL—VAN" (alluding to the fact that the concealment object is the open cargo van door 504).

Figure 5B:
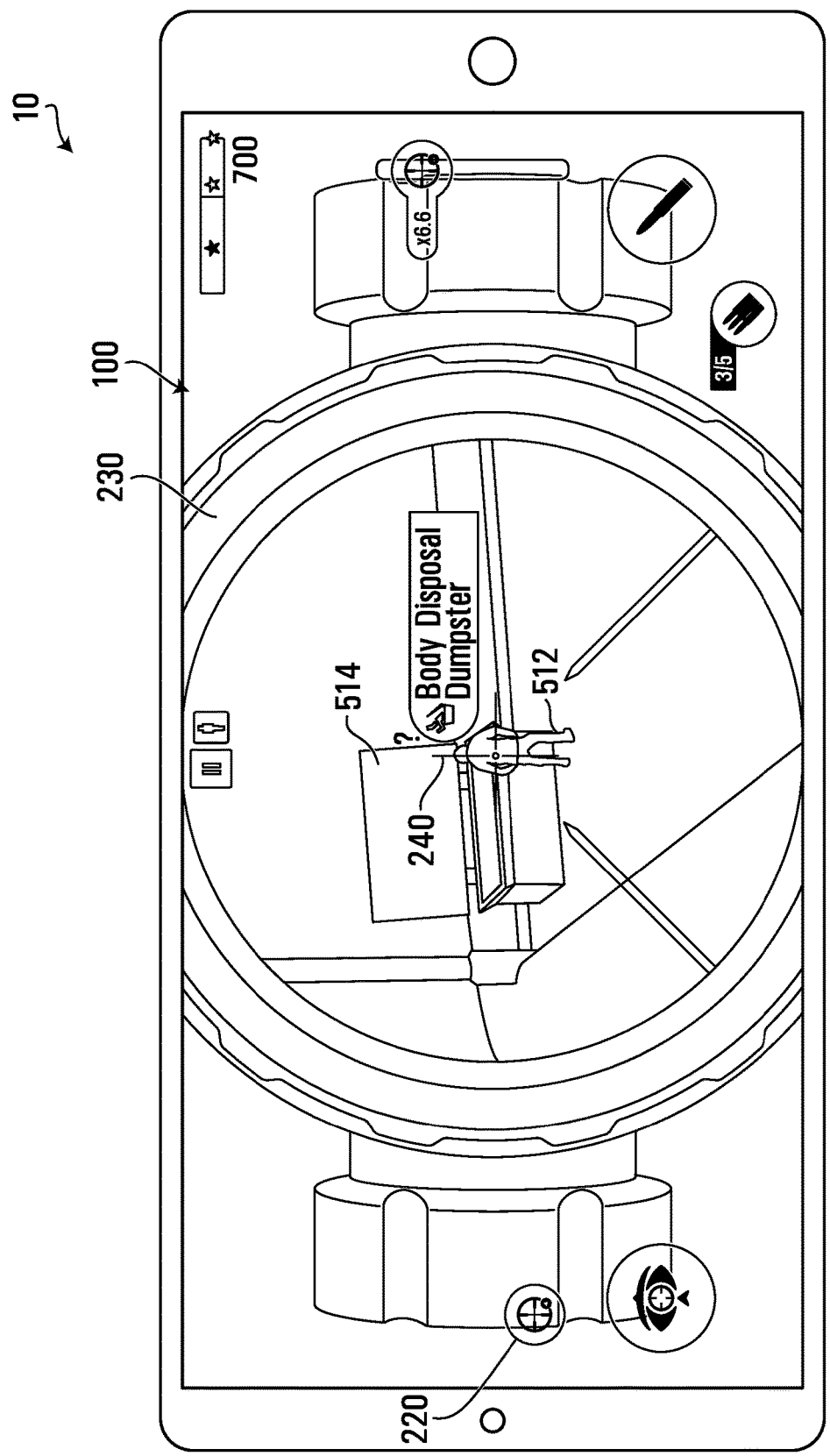

In a second non-limiting example, with reference to FIG. 5B, consider the case where the virtual gun 210 is aimed at an NPC 512 (i.e., such that the position condition is satisfied with respect to the NPC 512). Consider also that a concealment-type interactivity condition is satisfied for the NPC 512 and a concealment object that is, in this case, a dumpster 514. Here, the tactical assistance process may determine, at step 426NP, that the preview information is "BODY DISPOSAL". To be even more precise, the tactical assistance process may determine, at step 426NP, that the preview information is "BODY DISPOSAL—DUMPSTER" (alluding to the fact that the concealment object is the dumpster 514).

The tactical assistance process may also comprise a further step 434NP, whereby the concealment object (e.g., van door 504 or dumpster 514) may be emphasized in some graphical way (e.g., color, flashing, silhouette) to allow the player 1 to learn of the location of the concealment object while remaining focused on aiming the virtual gun 210.

Step 424LR: Second Game Object is a Lure Object

In case the second game object is a lure object, the interactive gameplay effect that would be carried out in the event of receipt of activation is a "lure", as described above. Thus, step 424LR may include obtaining preview information, which is followed by step 432LR, according to which the processor causes the virtual display component to display the preview information so obtained.

Figure 6A:
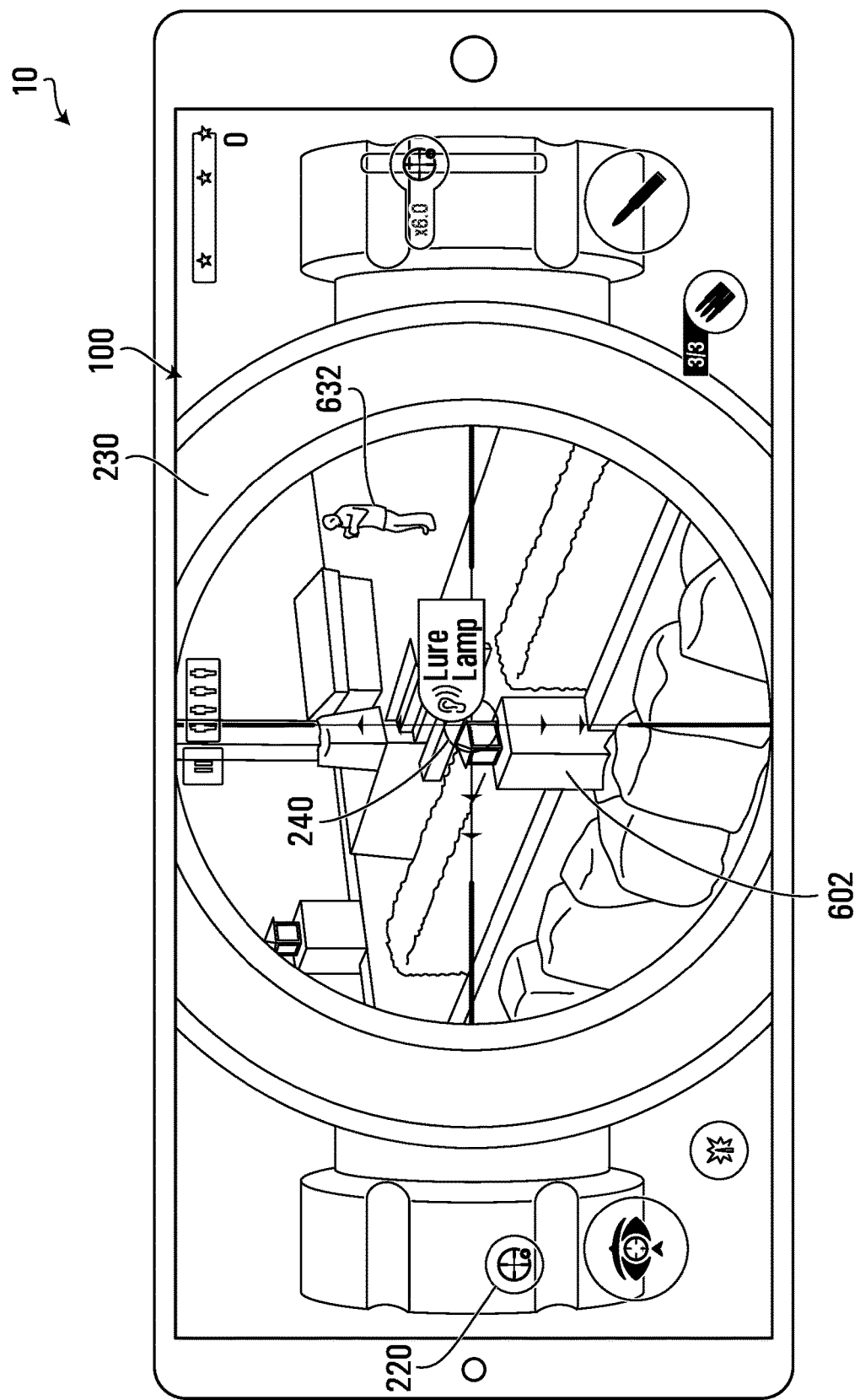
FIGS. 6A and 6B are example screen shots showing display of preview information in a scope window, the preview information being indicative of an interactive gameplay effect referred to as a lure.
Figure 6B:
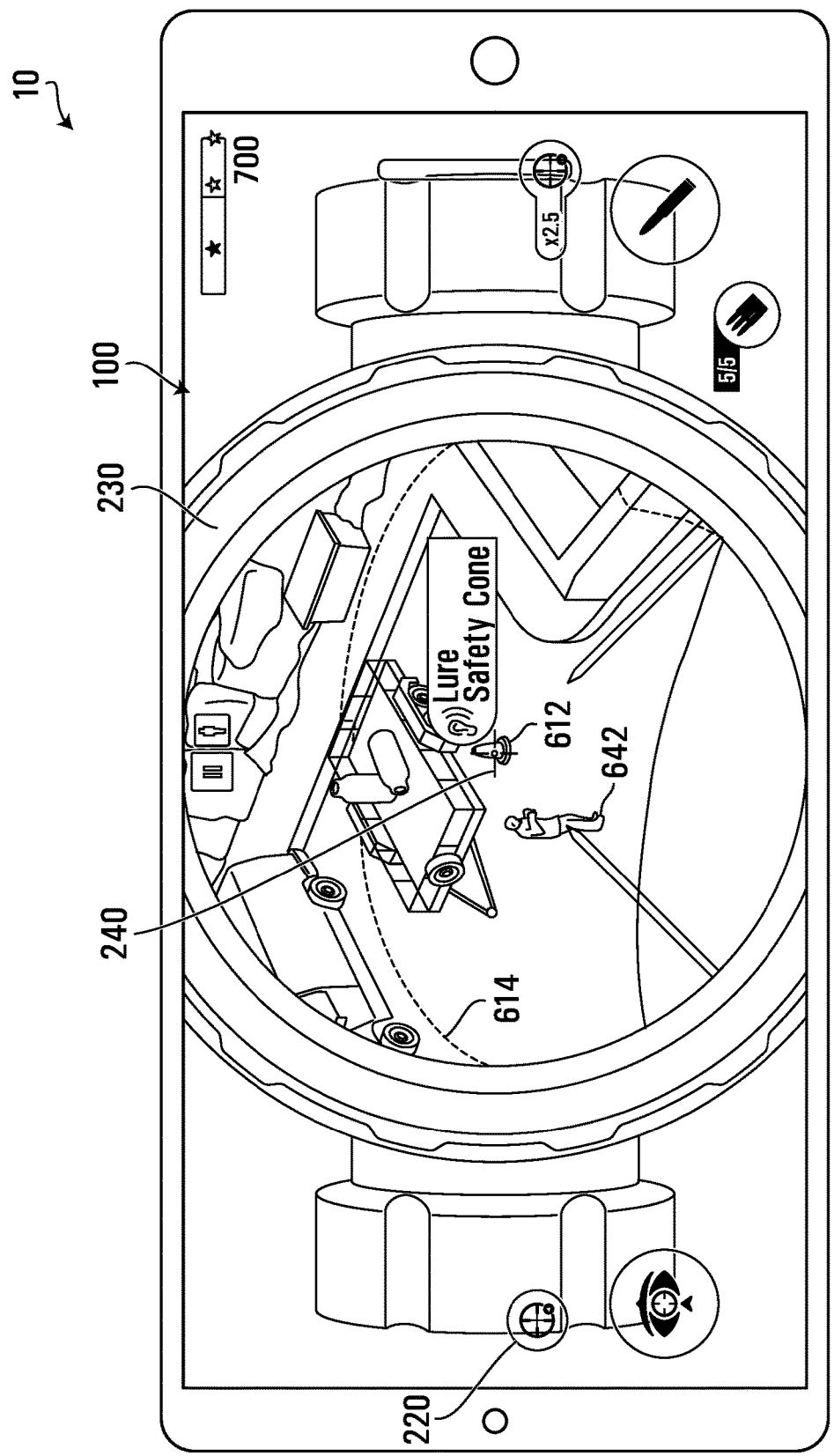

Consider the case where the virtual gun 210 is aimed at a lure object (i.e., such that position condition is satisfied with respect to the lure object). In the example of FIG. 6A, the lure object is a lamp 602 and the tactical assistance process determines, at step 424LR, that the preview information is "LURE—LAMP" (alluding to the fact that the lure object is the lamp 602); this preview information is displayed at step 432LR. In the example of FIG. 6B, the lure object is a safety cone 612 and the tactical assistance process determines, at step 424LR, that the preview information is "LURE—SAFETY CONE" (alluding to the fact that the lure object is the safety cone 612); this preview information is displayed at step 432LR.

In addition, the tactical assistance process may include step 434LR, whereby the lure object (e.g., lamp 602 or safety cone 612 in the above examples) may be emphasized in some graphical way (e.g., color, flashing, silhouette) to allow the player 1 to learn of the location of the lure object while remaining focused on aiming the virtual gun 210.

It is recalled that a lure object is associated with a lure zone and that the extent and/or limits and/or coordinates of the lure zone are maintained in memory in association with the lure object. As such, in addition to displaying the preview information at step 432LR, the tactical assistance process may carry out step 436LR whereby the lure zone around the lure object may be graphically rendered. For example, FIG. 6B shows a lure zone 614 around the safety cone 612, which would be graphically emphasized by performance of step 436LR.

It is recalled that if activation input were to be received, i.e., if the lure object were shot, any NPCs that meet a lure-type interactivity condition would be caused to change position, direction, speed, acceleration, etc., so as to move in a direction towards the lure object, in accordance with the game logic. In a non-limiting example, an NPC meets the lure-type interactivity condition if the NPC is within the lure zone, thereby becoming an "affected" NPC. Since the extent and/or limits and/or coordinates of the lure zone are maintained in memory in association with the lure object, the at least one processor 11 can determine which NPCs are inside the lure zone and are therefore the affected NPCs. As such, the tactical assistance process may include step 438LR, whereby the processor determines which NPCs, if any, are affected NPCs (e.g., which NPCs are in the lure zone) and step 439LR, whereby the affected NPC(s) is(are) graphically emphasized.

By way of example, in FIG. 6A, there is a single NPC 632 within the lure zone of the lamp 602 and in FIG. 6B, there is a single NPC 642 within the lure zone 614 of the safety cone 612. The affected NPCs 632, 642 may be graphically emphasized in a suitable way (e.g., color, flashing, silhouette, arrows, etc.) to allow the player 1 to learn of the presence and location of the affected NPCs while remaining focused on aiming the virtual gun 210 at the lamp 602 or the safety cone 604. There may be more than one NPC in a given lure zone.

The tactical assistance process may also include, as part of the preview information obtained at step 424LR, the number of affected NPCs, i.e., the number of NPCs for which the lure-type interactivity condition is satisfied. Thus, the steps described above can be performed in various orders, according to the desired effect.

Step 424AC: Second Game Object is an Accident Object

In case the second game object is an accident object, the interactive gameplay effect that would be carried out in the event of receipt of activation is an "accident", as described above. Thus, step 424AC may include obtaining preview information, which is followed by step 432AC, according to which the processor causes the virtual display component to display the preview information so obtained.

Figure 7A:
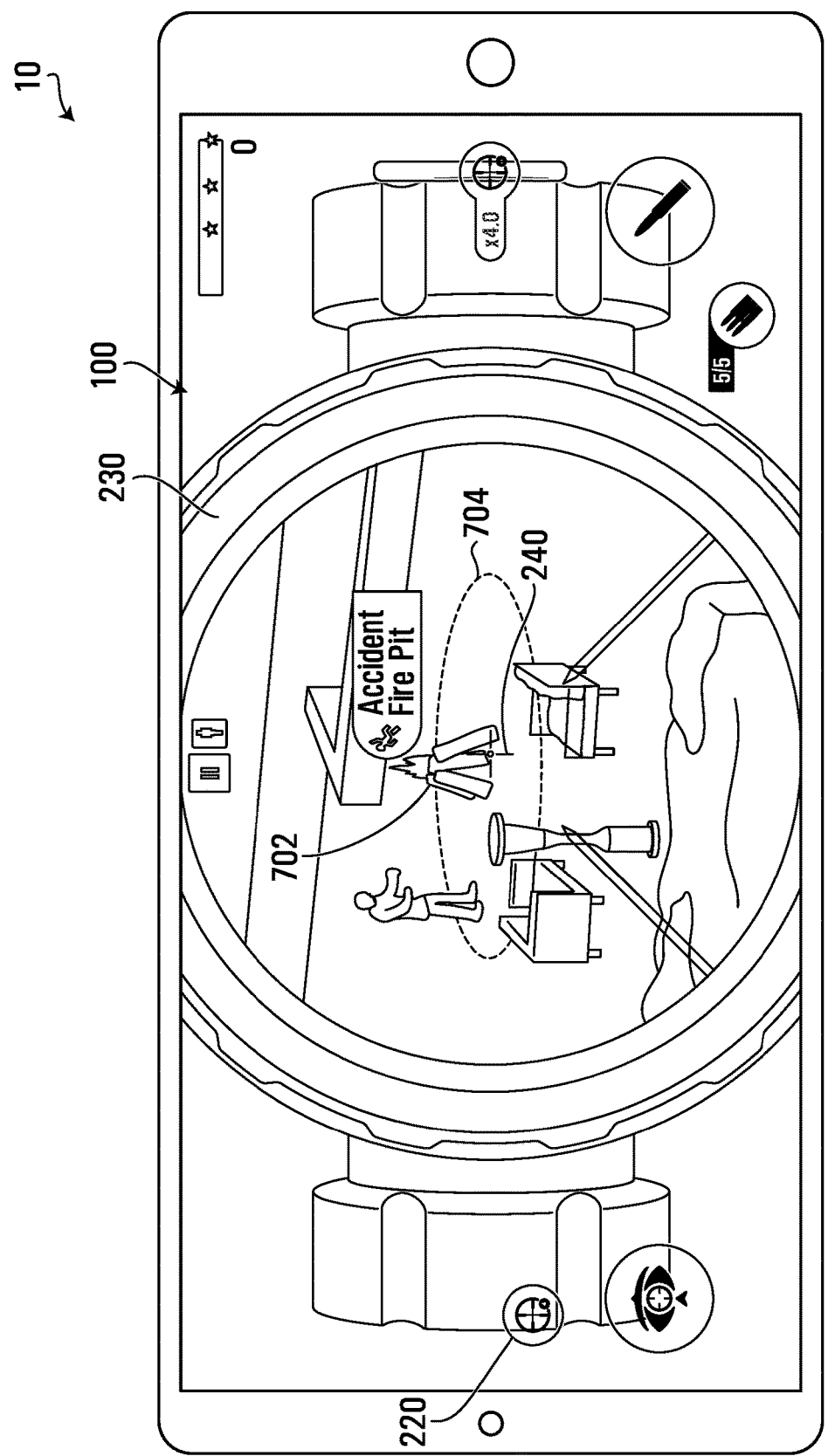
FIGS. 7A and 7B are example screen shots showing display of preview information in a scope window, the preview information being indicative of an interactive gameplay effect referred to as an accident.
Figure 7B:
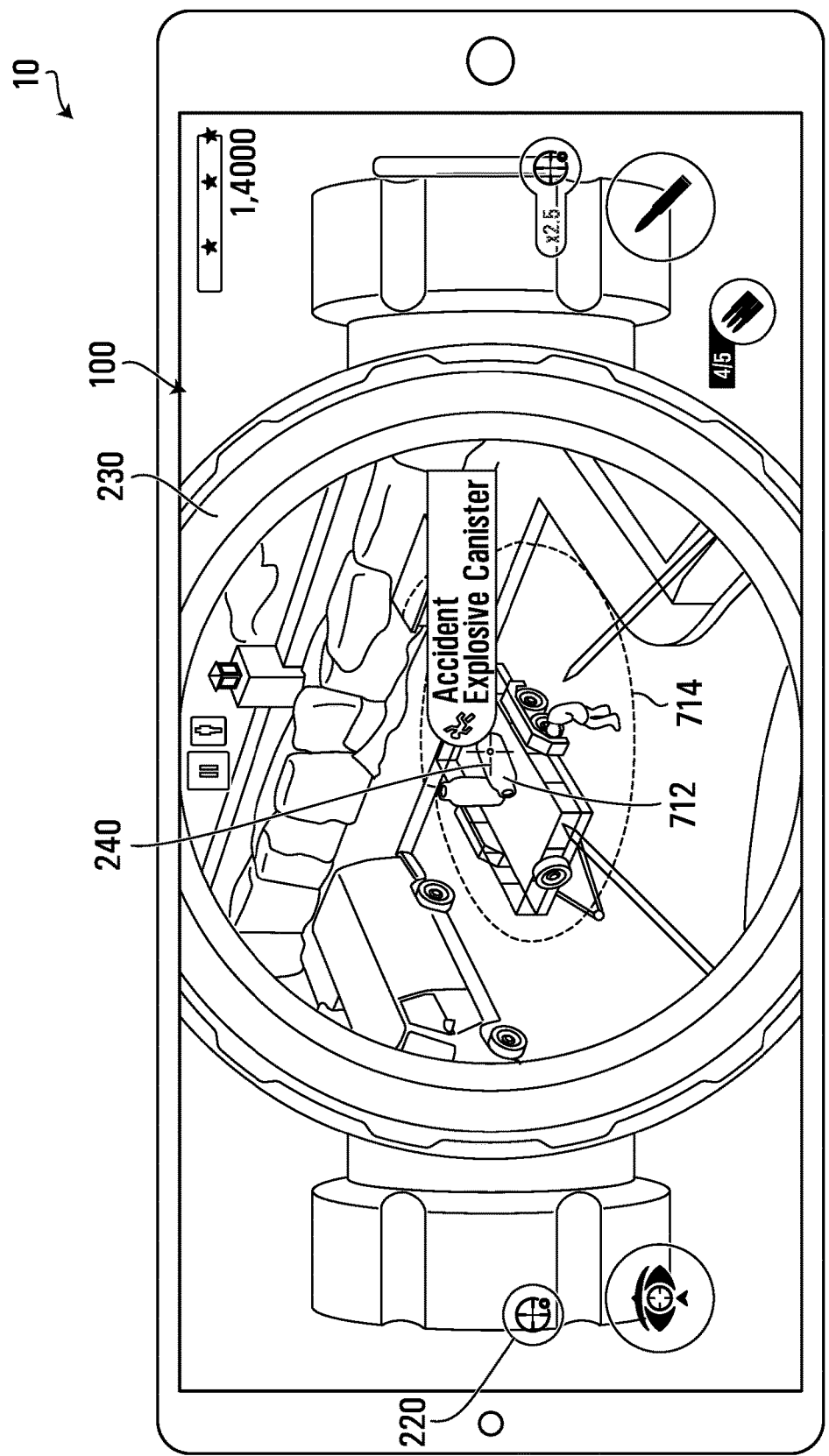

Consider the case where the virtual gun 210 is aimed at an accident object (i.e., such that position condition is satisfied with respect to the accident object). In the example of FIG. 7A, the accident object is a fire pit 702 and the tactical assistance process determines, at step 424AC, that the preview information is "ACCIDENT—FIRE PIT" (alluding to the fact that the accident object is the fire pit 702); this preview information is displayed at step 432AC. In the example of FIG. 7B, the accident object is an explosive canister and the tactical assistance process determines, at step 424AC, that the preview information is "ACCIDENT—EXPLOSIVE CANISTER" (alluding to the fact that the accident object is the explosive canister 712); this preview information is displayed at step 432AC.

In addition, the tactical assistance process may include step 434AC, whereby the accident object (e.g., fire pit 702 or explosive canister 712 in the above examples) may be emphasized in some graphical way (e.g., color, flashing, silhouette) to allow the player 1 to learn of the location of the accident object while remaining focused on aiming the virtual gun 210.

It is recalled that an accident object is associated with an accident zone and that the extent and/or limits and/or coordinates of the accident zone are maintained in memory in association with the accident object. As such, in addition to displaying the preview information at step 432AC, the tactical assistance process may carry out step 436AC whereby the accident zone around the accident object may be graphically rendered. For example, FIG. 7A shows an accident zone 704 around the fire pit canister 702, and FIG. 7B shows an accident zone 714 around the explosive canister 712, each of which would be graphically emphasized by performance of step 436AC.

It is recalled that if activation input were to be received, i.e., if the accident object were shot, any NPCs that meet an accident-type interactivity condition would be neutralized, damaged or killed, without having to be shot at directly. In a non-limiting example, an NPC meets the accident-type interactivity condition if the NPC is within the accident zone, thereby becoming an "affected" NPC. Since the extent and/or limits and/or coordinates of the accident zone are maintained in memory in association with the accident object, the processor can determine which NPCs are inside the accident zone and are therefore the affected NPCs. As such, the tactical assistance process may include step 438LR, whereby the processor determines which NPCs, if any, are affected NPCs (e.g., which NPCs are in the accident zone) and step 439AC, whereby the affected NPC(s) is(are) graphically emphasized.

By way of example, in FIG. 7A, there is a single NPC 732 within the accident zone 704 of the fire pit 702 and in FIG. 7B, there is a single NPC 742 within the accident zone 714 of the explosive canister 712. The affected NPCs 732, 742 may be graphically emphasized in a suitable way (e.g., color, flashing, silhouette, arrows, etc.) to allow the player 1 to learn of the presence and location of the affected NPCs while remaining focused on aiming the virtual gun 210 at the fire pit 702 or the explosive canister 712. There may be more than one NPC in a given accident zone.

The tactical assistance process may also include, as part of the preview information obtained at step 424AC, the number of affected NPCs, i.e., the number of NPCs for which the accident-type interactivity condition is satisfied. Thus, the steps described above can be performed in various orders, according to the desired effect.

IV. Conclusion

Provided that the scope window 230 is enabled, and also that a position condition involving the current position and orientation of the virtual gun 210 with respect to a second game object is satisfied, the preview information output by the tactical assistance process includes a message to the player 1 informing him/her as to the interactive gameplay effect that would take place if he/she were to provide activation input (e.g., a shooting command). The display of this message in the scope window 230 may require that the virtual gun 210 be aimed (without necessarily being fired) at the second game object, i.e., that a position condition be satisfied between the aiming zone 240 and such second game object.

In some cases, the second game object may be an NPC, in which case the display of preview information indicative of an interactive gameplay effect in the scope window 230 (e.g., "body disposal") may be conditional upon an interactivity condition for the NPC and a third game object (e.g., a concealment object) being satisfied. This is detailed in the description of steps 422NP-426NP herein above, by way of non-limiting example.

In other cases, the second game object may be a certain type of interactive environment object (e.g., lure object or accident object), in which case the display of preview information indicative of an interactive gameplay effect in the scope window 230 (e.g., "lure" or "accident") need not be conditional upon an interactivity condition being satisfied. However, the interactive gameplay effect itself may not actually be carried out unless the interactivity condition is satisfied for the interactive environment object and a third game object (e.g., an NPC). This is detailed in the description of steps 424LR-439LR and 424AC-439AC herein above, by way of non-limiting example.

It should be appreciated that the preview information caused to be displayed inside the display component (e.g., at steps 430, 432NP, 432LR, 432AC) may include a change in score that would arise if activation input were provided.

It should be appreciated that in addition to the preview information caused to be displayed inside the display component (e.g., scope window, e.g., at steps 430, 432NP, 432LR, 432AC), other preview information may be placed elsewhere on the player's screen 100, outside the scope window 230.

It should be appreciated that the preview information caused to be displayed inside the display component associated with the player-controlled game object may be accompanied by audio information generated by the at least one processor 11. Such audio information may describe or read the preview information using sound conveyed via a loudspeaker.

As such, the preview information caused to be placed inside the display component may allude to an interactive gameplay effect involving at least the NPC or interactive environment object being aimed at (for which a position condition is satisfied—see step 410). Such preview information may therefore provide tactical assistance to the player 1, allowing him/her to maximize the available points to be gained and/or optimize progress through the game. In particular, the player 1 may be provided with a hint about when may be a suitable time to provide activation input, and what would occur, while allowing the player 1 to focus attention on the position and contents of the aiming zone 240.

It should also be appreciated that the preview information displayed in the scope window 230 changes with the position and/or orientation of the virtual gun 210, thereby signaling differences in the outcome of the player 1 providing an activation input. Such differences may represent differences in score and/or game progression. As such, player behavior may be influenced, i.e., the player 1 may change the position and/or orientation of the virtual gun 210 until the scope window 230 displays preview information that meets certain desiderata that would lead the player 1 to supply the activation input. As such, the provision of a scope window 230 with preview information in accordance with aspects of the present disclosure may incite the player 1 to take physical actions, such as swiping a touchscreen to position or orient the virtual gun 210.

It should be understood that various embodiments of the disclosure are applicable to games that are displayed on a 2-dimensional screen as well as 3-D displays and virtual reality headsets.

In some cases, the video game apparatus 10 is distributed between, on the one hand, a server connected to the internet and, on the other, one or more internet appliances also connected to the internet. Multiple players may therefore participate in the same video game, and the functionality of the computer-readable instructions 18 (the game rendering function 24 and/or the game data processing function 23) may be executed at least in part by the server.

Those skilled in the art will appreciate that the description and drawings merely illustrate certain principles and that various arrangements may be devised which, although not explicitly described or shown herein, embody such principles. Furthermore, the examples and conditions recited herein are mainly intended to aid the reader in understanding such principles and are to be construed as being without limitation to such specifically recited examples and conditions.

Some embodiments are also intended to cover program storage devices, e.g., digital data storage media, which are, machine or computer-readable and encode machine-executable or computer-executable programs of instructions, wherein said instructions perform some or all of the steps of the above-described methods. The embodiments are also intended to cover computers programmed to perform said steps of the above-described methods.

Those skilled in the art will appreciate that when a processor is described as being "configured" to carry out an action or process, this can mean that the processor carries out the action or process by virtue of executing computer-readable instructions that are read from device memory where these computer-readable instructions are stored.

Those skilled in the art should appreciate that any feature of any embodiment disclosed herein may combined with (e.g., used instead of or in addition to) any feature of any other embodiment disclosed herein in some examples of implementation. Certain additional elements that may be needed for operation of some embodiments have not been described or illustrated as they are assumed to be within a purview of those ordinarily skilled in the art. Moreover, certain embodiments may be free of, may lack and/or may function without any element that is not specifically disclosed herein.

Although various embodiments and examples have been presented, this was for purposes of description, but should not be limiting. Various modifications and enhancements will become apparent to those ordinarily skill in the art.

What is claimed is:

1. A method of operating at least one processor of a video game apparatus, the method comprising:

maintaining a virtual environment in memory, the virtual environment comprising a player-controlled game object and a second game object, the player-controlled game object being associated with a scope window, wherein the second game object is an aim of the player-controlled game object within the scope window;

determining a type of the second game object;

determining a type of condition pertaining to the determined type of the second game object; and determining if the condition of the determined type associated with the second game object is met and, if so, obtaining preview information indicative of an interactive gameplay effect that would be carried out in the event of receipt of activation input via a game control interface and displaying the preview information in the scope window displayed on a screen, wherein the preview information is indicative of information associated with the type of the second game object, wherein the second game object comprises an NPC and wherein the interactive gameplay effect includes causing the NPC to be hidden by a concealment object if the NPC is within a threshold distance of the concealment object in the virtual environment, and not to be hidden otherwise.

2. The method defined in claim 1, wherein the scope window of the player-controlled game object is associated with an aiming zone, and wherein determining if the condition of the determined type associated with the second game object comprises determining if the aiming zone is within a threshold distance of the second game object.

3. The method defined in claim 2, wherein the aiming zone has a center defined by crosshairs or a reticle.

4. The method defined in claim 3, further comprising displaying the aiming zone in the scope window displayed on the screen.

5. The method defined in claim 1, further comprising:
receiving navigation input via the game control interface; and
at least one of positioning and orienting the player-controlled game object within the virtual environment based on the navigation input.

6. The method defined in claim 5, the method further comprising displaying in the scope window a portion of the virtual environment that is visible in the scope window from a point of view that is associated with a position of the player-controlled game object.

7. The method defined in claim 6, wherein positioning the player-controlled game object changes a position of the point of view in the virtual environment.

8. The method defined in claim 7, wherein orienting the player-controlled game object changes the portion of the virtual environment that is visible in the scope window from the point of view.

9. The method defined in claim 8, wherein the portion of the virtual environment that is displayed in the scope window has a magnified appearance compared to a portion of the virtual environment that is not displayed in the scope window.

10. The method defined in claim 9, further comprising receiving via the game control interface a player command to disable the scope window and deactivating the scope window in response to the command.

11. The method defined in claim 10, wherein further to deactivating the scope window, an area of the screen previously occupied by the scope window when activated is caused to display a non-magnified portion of the virtual environment.

12. The method defined in claim 1, wherein the player-controlled game object comprises a virtual gun.

13. The method defined in claim 12, wherein the activation input comprises a command to fire the virtual gun.

14. The method defined in claim 1, wherein the preview information is obtained from the memory.

15. The method defined in claim 1, wherein if the second game object is an NPC, the method further comprises determining if an interactivity condition involving the NPC and an interactive game object of a certain type is satisfied, wherein the displaying is carried out only if the interactivity condition is satisfied.

16. The method defined in claim 15, wherein the interactivity condition being satisfied depends on a proximity between the NPC and the interactive game object of the certain type.

17. The method defined in claim 15, further comprising graphically emphasizing the interactive game object of the certain type but only if the interactivity condition is satisfied.

18. The method defined in claim 17, wherein the displaying and graphically emphasizing are further only carried out if the interactive game object is a concealment object.

19. The method defined in claim 18, wherein the preview information indicates body disposal.

20. The method defined in claim 18, wherein the concealment object comprises at least one of a bush, a bin, a wall, a well, a door, a vehicle, a pit, a container, a body of water and a snowbank.

21. The method defined in claim 17, wherein if the interactive game object is a concealment object, rendering the concealment object on the screen so as to conceal the NPC.

22. The method defined in claim 1, wherein if the second game object is an interactive game object of a certain type, the method further comprises determining a zone associated with the interactive game object and graphically emphasizing the zone.

23. The method defined in claim 1, wherein if the second game object is an interactive game object of a certain type, the method further comprises determining if an interactivity condition involving the interactive game object and a non-player character (NPC) is satisfied and, if so, the method further comprises emphasizing the interactive game object.

24. The method defined in claim 23, wherein the interactivity condition being satisfied depends on a relative position of the NPC and the interactive game object.

25. The method defined in claim 23, wherein the interactivity condition being satisfied depends on whether the NPC is positioned within a zone associated with the interactive game object.

26. The method defined in claim 25, wherein the zone extends to an area above the NPC in the virtual environment.

27. The method defined in claim 26, wherein if the second game object is an interactive game object of the certain type, the method further comprises graphically emphasizing the zone and the NPC if the NPC is positioned within the zone.

28. The method defined in claim 23, wherein the preview information is indicative of the certain type of interactive game object.

29. The method defined in claim 23, wherein if the interactive game object is a lure object, the preview information is indicative of a lure and wherein if the interactive game object is an accident object, the preview information is indicative of an accident.

30. The method defined in claim 23, wherein if the interactive game object is a lure object, the method further comprises indicating at least one NPC that would be lured towards the interactive game object if the activation input were provided.

31. The method defined in claim 23, wherein if the interactive game object is an accident object, the method further comprises indicating an NPC that would be neutralized if the activation input were provided.

32. The method defined in claim 31, wherein the second game object comprises an interactive game object and wherein the interactive gameplay effect includes the NPC being neutralized if the NPC is within a zone associated with the interactive game object, and not to be neutralized otherwise.

33. The method defined in claim 23, wherein the interactive gameplay effect includes the NPC changing position, direction, speed and/or acceleration if the NPC is within a zone associated with the interactive game object.

34. The method defined in claim 23, wherein the interactive gameplay effect includes the NPC being lured towards the interactive game object if the NPC is within a zone associated with the interactive game object, and not being lured towards the interactive game object otherwise.

35. The method defined in claim 1, further comprising receiving the activation input via the game control interface and carrying out the interactive gameplay effect in response to said receiving the activation input.

36. The method defined in claim 1, further comprising showing a change of score that would result from carrying out the interactive gameplay effect and showing the change in player score in the scope window associated with the player-controlled game object.

37. A non-transitory computer-readable storage medium comprising computer-readable instructions which, when read and executed by at least one processor, cause the at least one processor to execute a method that comprises:
  maintaining a virtual environment in memory, the virtual environment comprising a player-controlled game object and a second game object, the player-controlled game object being associated with a scope window, wherein the second game object is an aim of the player-controlled game object within the scope window;
  determining a type of the second game object;
  determining a type of condition pertaining to the determined type of the second game object; and
  determining if the condition of the determined type associated with the second game object is met and, if so, obtaining preview information indicative of an interactive gameplay effect that would be carried out in the event of receipt of activation input via a game control interface and displaying the preview information in the scope window displayed on a screen, wherein the preview information is indicative of information associated with the type of the second game object, wherein the second game object comprises an NPC and wherein the interactive gameplay effect includes causing the NPC to be hidden by a concealment object if the NPC is within a threshold distance of the concealment object in the virtual environment, and not to be hidden otherwise.

38. A video game apparatus comprising:
at least one processor;
a memory storing instructions for execution by the at least one processor; and
at least one input device configured to receive input from a player, at least one output device configured for providing output to the player,
wherein the at least one processor is configured to execute the instructions in the memory for implementing an interactive computer program that generates the output in response to the received input and, the interactive computer program including at least one process that comprises:
maintaining a virtual environment in memory, the virtual environment comprising a player-controlled game object and a second game object, the player-controlled game object being associated with a scope window, wherein the second game object is an aim of the player-controlled game object within the scope window;
determining a type of the second game object;
determining a type of condition pertaining to the determined type of the second game object; and
determining if the condition of the determined type associated with the second game object is met and, if so, obtaining preview information indicative of an interactive gameplay effect that would be carried out in the event of receipt of activation input via a game control interface and displaying the preview information in the scope window displayed on a screen, wherein the preview information is indicative of information associated with the type of the second game object, wherein the second game object comprises an NPC and wherein the interactive gameplay effect includes causing the NPC to be hidden by a concealment object if the NPC is within a threshold distance of the concealment object in the virtual environment, and not to be hidden otherwise.

\* \* \* \* \*